United States Patent
Miyoshi et al.

(10) Patent No.: US 9,055,302 B2
(45) Date of Patent: Jun. 9, 2015

(54) VIDEO ENCODER AND VIDEO DECODER

(75) Inventors: Hidenobu Miyoshi, Kawasaki (JP); Akira Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 596 days.

(21) Appl. No.: 13/530,874

(22) Filed: Jun. 22, 2012

(65) Prior Publication Data

US 2012/0263238 A1 Oct. 18, 2012

Related U.S. Application Data

(63) Continuation of application No. PCT/JP2009/007359, filed on Dec. 28, 2009.

(51) Int. Cl.
*H04N 7/32* (2006.01)
*H04N 19/577* (2014.01)
(Continued)

(52) U.S. Cl.
CPC ........... *H04N 19/577* (2014.11); *H04N 19/176* (2014.11); *H04N 19/46* (2014.11); *H04N 19/129* (2014.11); *H04N 19/61* (2014.11); *H04N 19/14* (2014.11); *H04N 19/137* (2014.11);
(Continued)

(58) Field of Classification Search
CPC ................ H04N 19/573; H04N 19/61; H04N 19/00587; H04N 19/109; H04N 19/13; H04N 19/146; H04N 19/176; H04N 19/52; H04N 19/12; H04N 19/51; H04N 19/577; H04N 19/60; H04N 19/129
USPC ....................................... 375/240.01–240.29
See application file for complete search history.

(56) References Cited

U.S. PATENT DOCUMENTS 6,263,026 B1 * 7/2001 Je-Chang et al. ........ 375/240.23
6,426,975 B1 7/2002 Nishi et al.
(Continued)

FOREIGN PATENT DOCUMENTS

EP    0 893 925 A2    1/1999
JP    3-283989    12/1991
(Continued)

OTHER PUBLICATIONS

English Translation of the Written Opinion of the International Searching Authority issued Apr. 13, 2010 in corresponding International Patent Application No. PCT/JP2009/007359.
(Continued)

*Primary Examiner* — Sath V Perungavoor
*Assistant Examiner* — Nathanael Aynalem
(74) *Attorney, Agent, or Firm* — Staas & Halsey LLP

(57) ABSTRACT

A video encoder includes: a motion compensation picture signal generator to generate a plurality of motion compensation picture signals in accordance with an encoding target signal and a plurality of reference pictures; a prediction signal generator to generate a prediction signal of the encoding target signal by utilizing the plurality of motion compensation picture signals; a prediction error signal generator to generate a prediction error signal; a selector to select, from among a plurality of scan patterns prepared for generating encoded information from the prediction error signal, a scan pattern that is expected to minimize an information amount of an encoded state of the prediction error signal, in accordance with the plurality of motion compensation picture signals; and a zigzag scanner to generate encoded information from the prediction error signal by using the scan pattern selected by the selector.

19 Claims, 19 Drawing Sheets

(51) Int. Cl.
*H04N 19/176* (2014.01)
*H04N 19/129* (2014.01)
*H04N 19/61* (2014.01)
*H04N 19/137* (2014.01)
*H04N 19/186* (2014.01)
*H04N 19/146* (2014.01)
*H04N 19/93* (2014.01)
*H04N 19/46* (2014.01)
*H04N 19/14* (2014.01)
*H04N 19/436* (2014.01)

(52) U.S. Cl.
CPC ........... *H04N19/186* (2014.11); *H04N 19/146* (2014.11); *H04N 19/436* (2014.11); *H04N 19/93* (2014.11)

(56) References Cited

U.S. PATENT DOCUMENTS

| | | | |
|---|---|---|---|
| 2003/0048208 A1* | 3/2003 | Karczewicz | 341/67 |
| 2003/0103679 A1 | 6/2003 | Etoh et al. | |
| 2003/0128753 A1* | 7/2003 | Lee et al. | 375/240.2 |
| 2003/0156648 A1* | 8/2003 | Holcomb et al. | 375/240.18 |
| 2004/0042669 A1* | 3/2004 | Jeon et al. | 382/232 |
| 2009/0097571 A1* | 4/2009 | Yamada et al. | 375/240.25 |

FOREIGN PATENT DOCUMENTS

| | | |
|---|---|---|
| JP | 03-283989 | 12/1991 |
| JP | 2000-50267 | 2/2000 |
| JP | 2000-59785 | 2/2000 |
| JP | 2002-314428 | 10/2002 |
| JP | 2003-250157 | 9/2003 |
| JP | 2006-211304 | 8/2006 |
| JP | 2008-17295 | 1/2008 |

OTHER PUBLICATIONS

International Preliminary Report on Patentability mailed Jul. 12, 2012 in corresponding International Patent Application No. PCT/JP2009/007359.

International Search Report of PCT/JP2009/007359 mailed Apr. 13, 2010.

Japanese Office Action for corresponding Japanese Application 2011-547115; Mailed May 28, 2013.

* cited by examiner

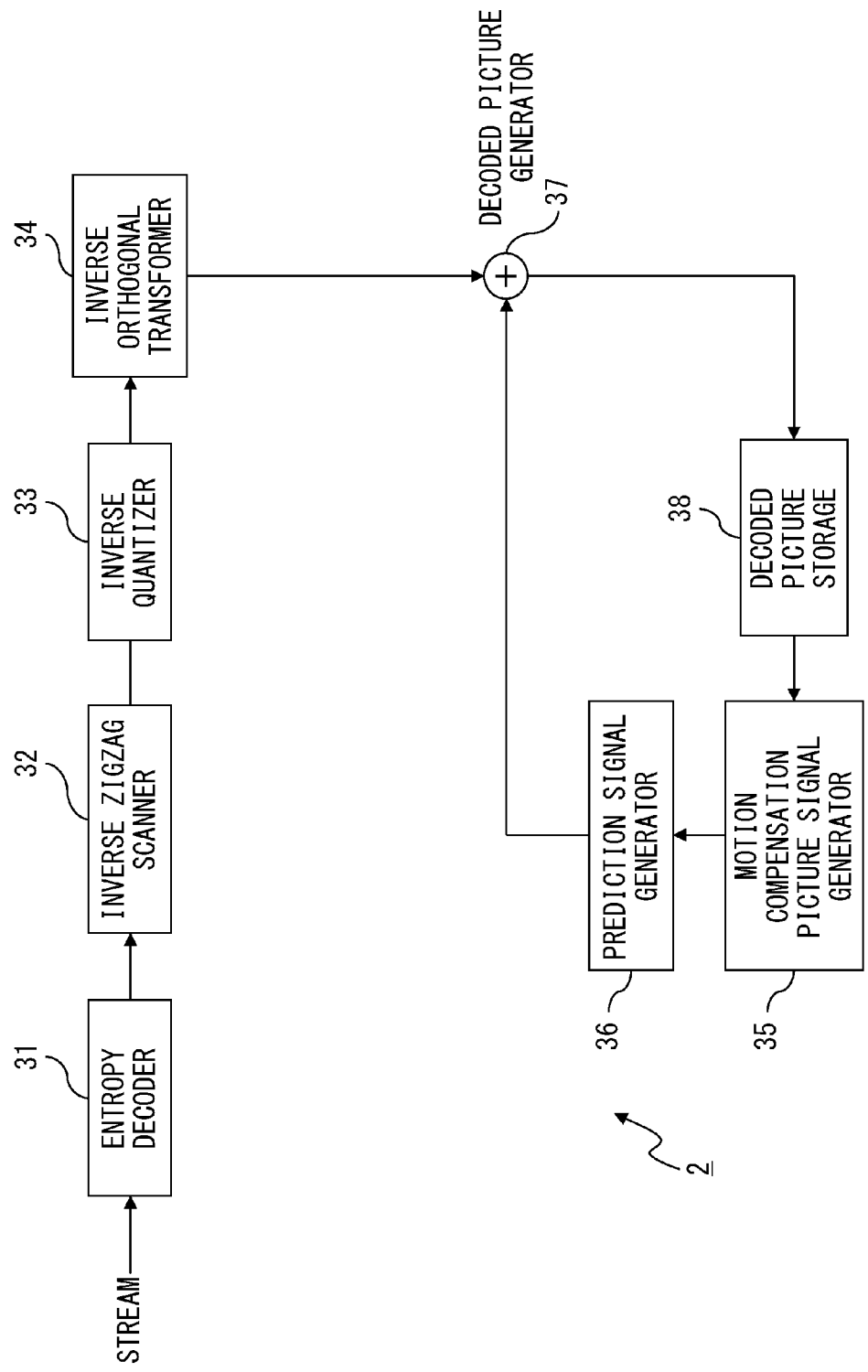
F I G. 2

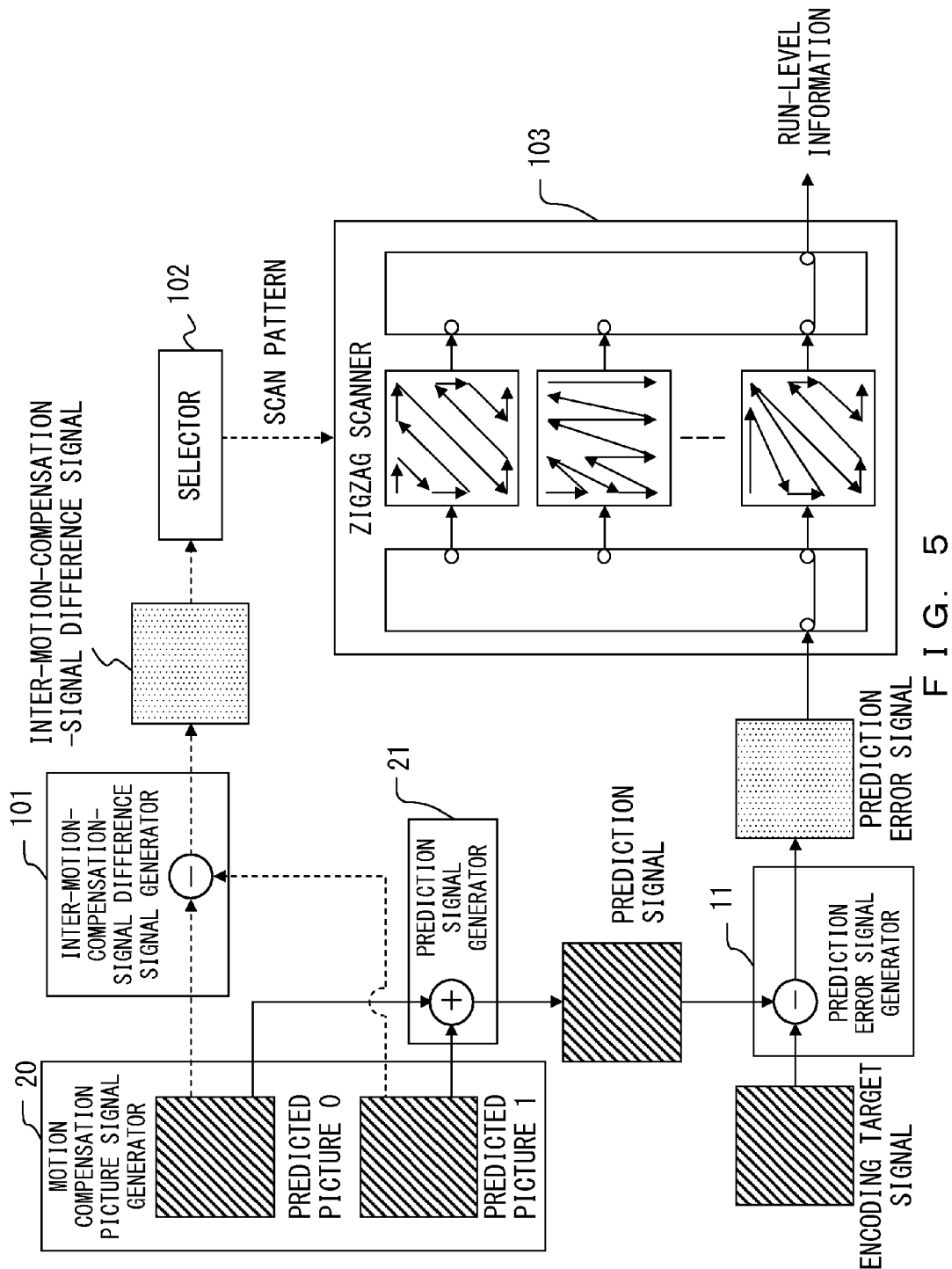
F I G. 5

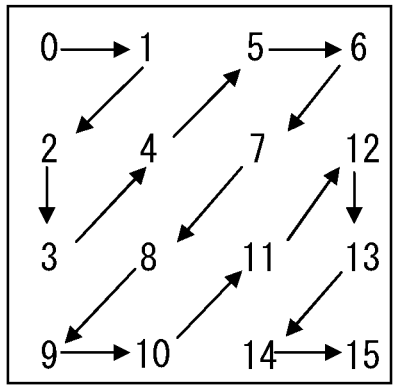
H.264-FRAME SCAN
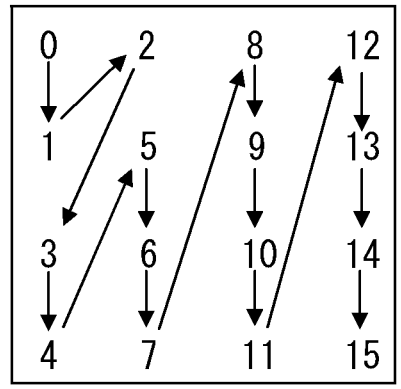
H.264-FIELD SCAN
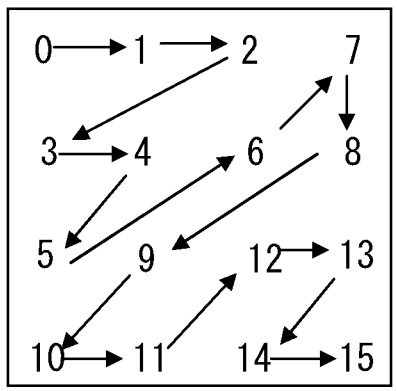
VERTICAL-EDGE-ORIENTED SCAN
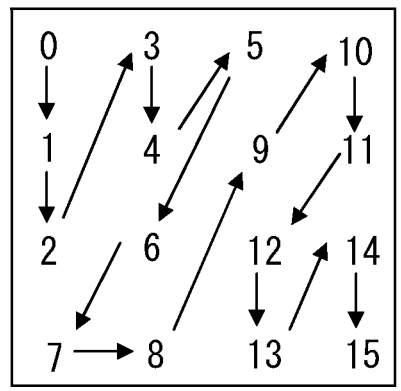
HORIZONTAL-EDGE-ORIENTED SCAN
F I G. 6

F I G. 7 A

| +25 | −4 | +9 | −2 |
|---|---|---|---|
| +10 | 0 | +2 | −1 |
| +1 | 0 | 0 | 0 |
| 0 | 0 | 0 | 0 |

F I G. 7 B

| +25 | −4 | +10 | +1 | 0 | +9 | −2 | +2 | 0 | 0 | 0 | 0 | −1 | 0 | 0 | 0 |
|---|---|---|---|---|---|---|---|---|---|---|---|---|---|---|---|

F I G. 7 C

| +25 | +10 | −4 | +1 | 0 | 0 | 0 | 0 | +9 | +2 | 0 | 0 | −2 | −1 | 0 | 0 |
|---|---|---|---|---|---|---|---|---|---|---|---|---|---|---|---|

F I G. 7 D

| +25 | −4 | +9 | +10 | 0 | +1 | +2 | −2 | −1 | 0 | 0 | 0 | 0 | 0 | 0 | 0 |
|---|---|---|---|---|---|---|---|---|---|---|---|---|---|---|---|

F I G. 7 E

| +25 | +10 | +1 | −4 | 0 | +9 | 0 | 0 | 0 | +2 | −2 | −1 | 0 | 0 | 0 | 0 |
|---|---|---|---|---|---|---|---|---|---|---|---|---|---|---|---|

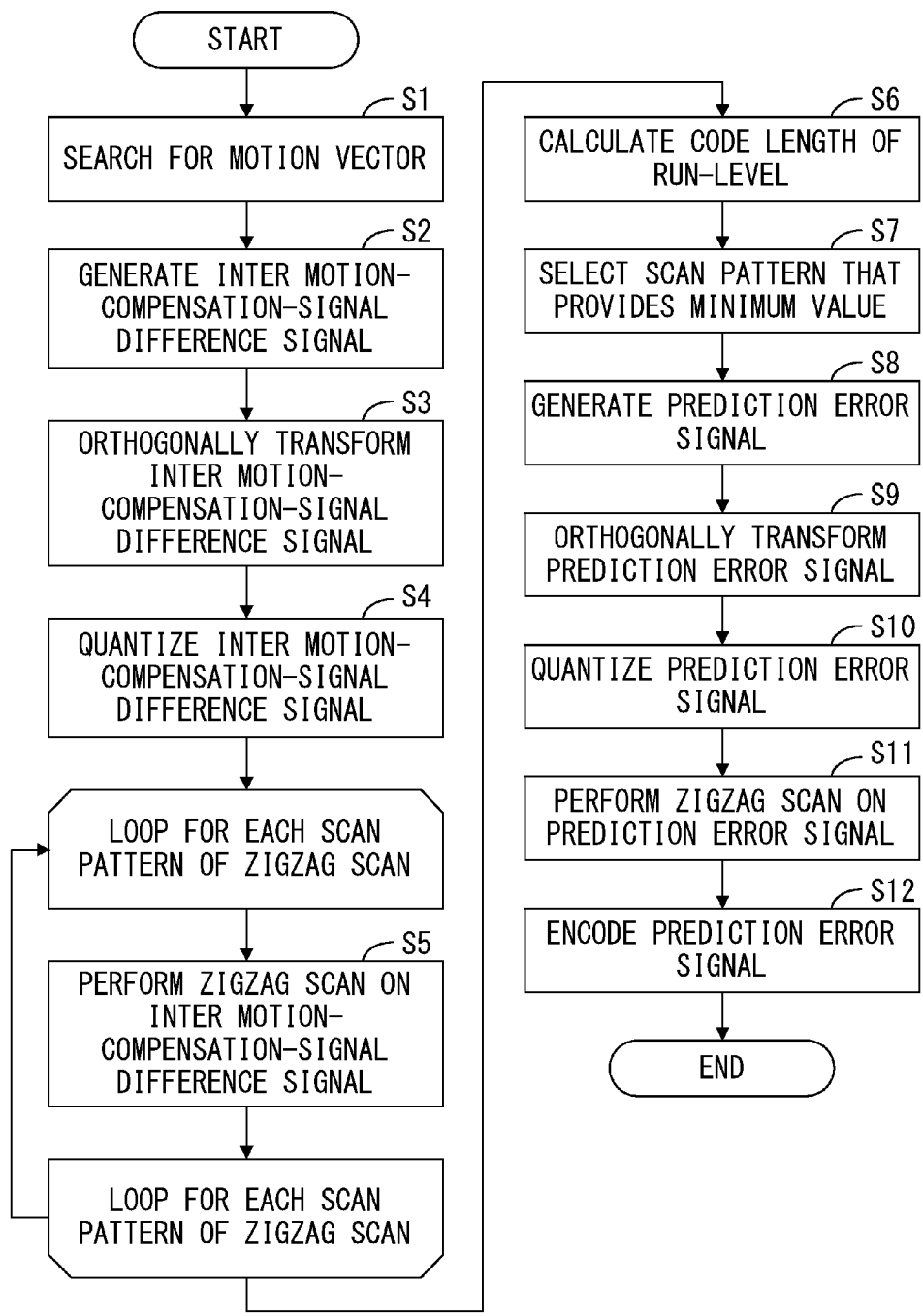
F I G. 1 0

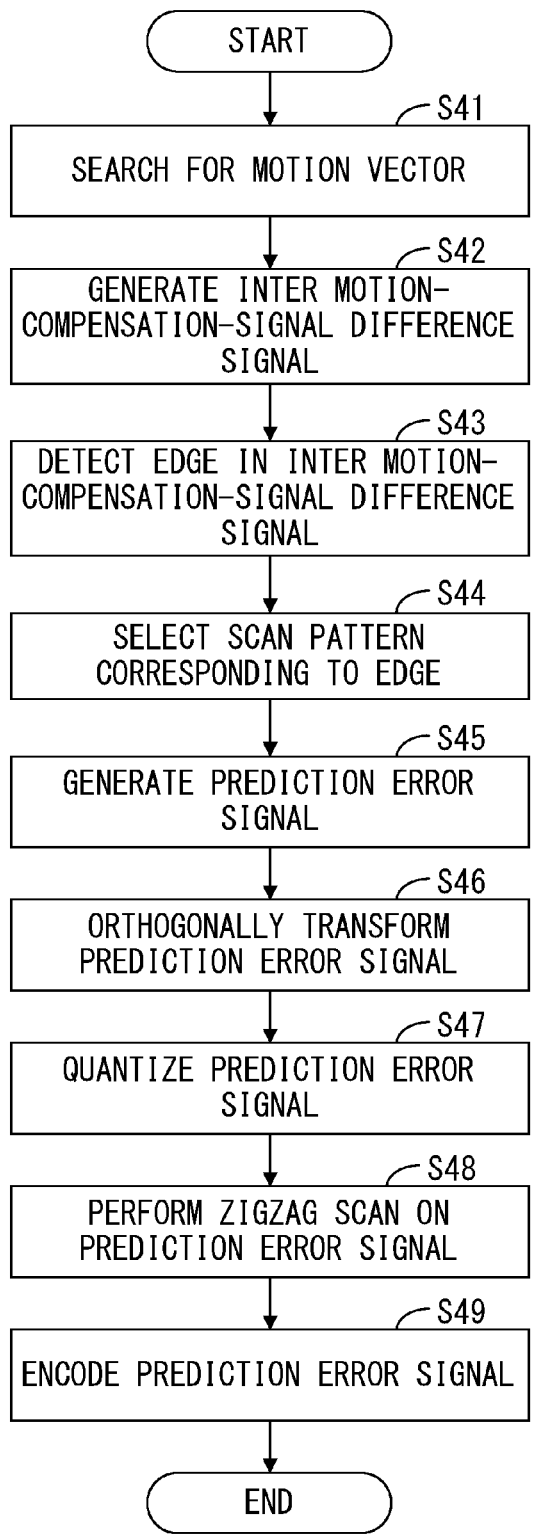
F I G. 14

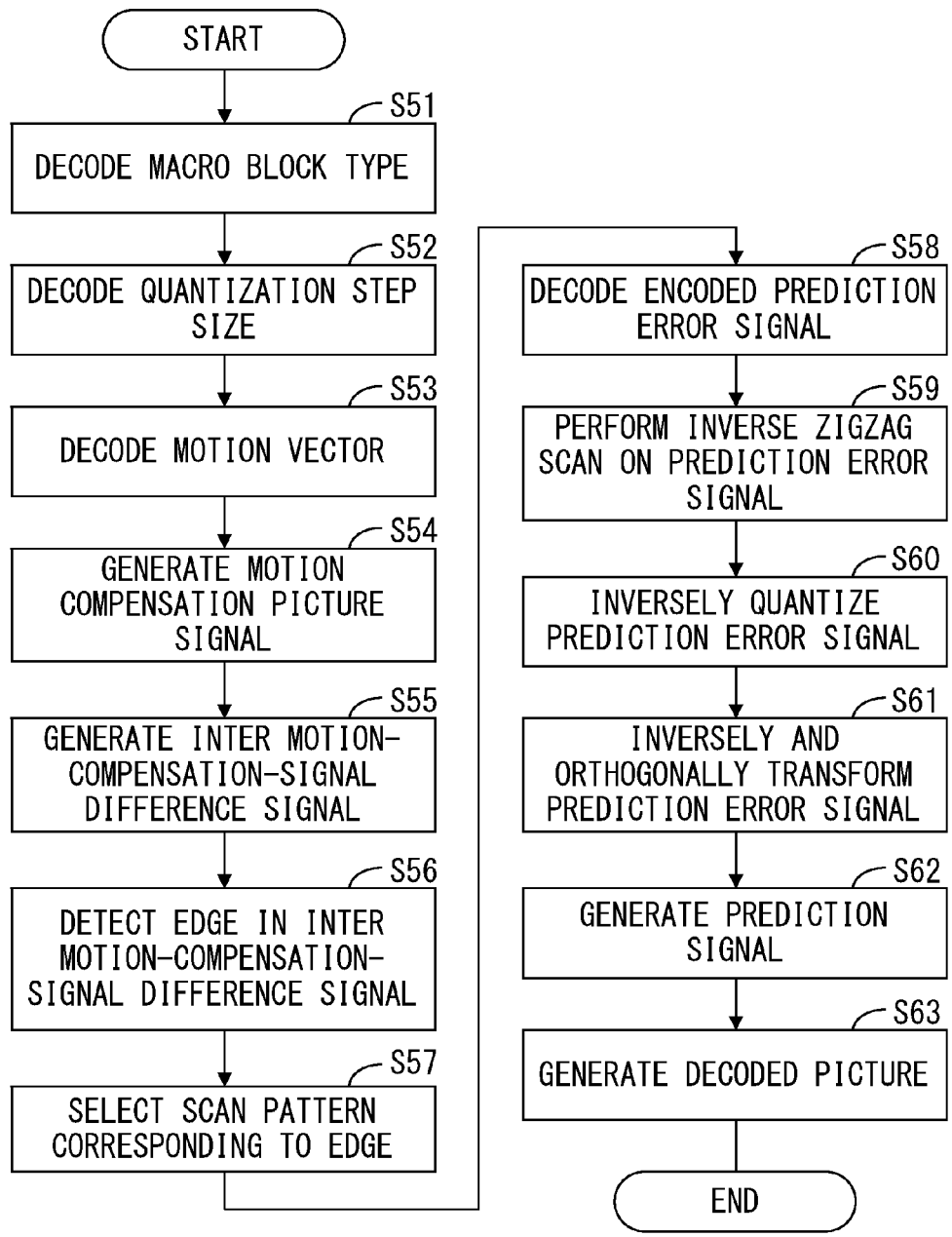
F I G. 1 6

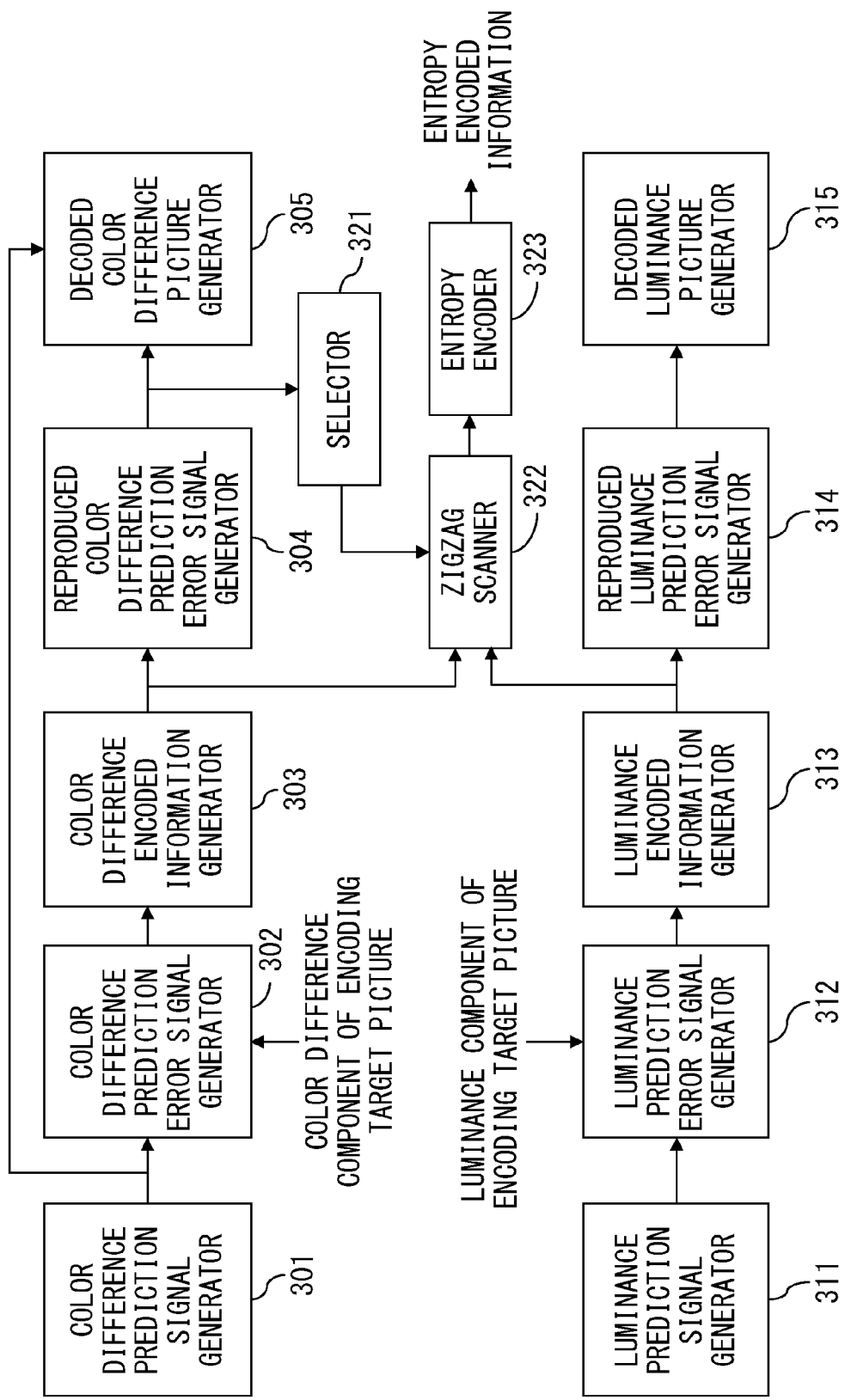
F I G . 1 7

VIDEO ENCODER AND VIDEO DECODER

CROSS-REFERENCE TO RELATED APPLICATION

This application is a continuation of an international application PCT/JP2009/007359, which was filed on Dec. 28, 2009.

FIELD

The embodiments described herein are related to an encoder, an encoding method, and an encoding program to encode video data, and also to a decoder, a decoding method, and a decoding program to decode encoded video data.

BACKGROUND

Video data is encoded in a highly efficient encoding scheme when it is transmitted from a transmitter device to a receiver device, when it is stored in a storage device, or in other situations. "Highly efficient encoding" is an encoding process to transform a data stream into a different data stream in order to compress the data volume.

As a highly efficient encoding method for video data, an intra-picture prediction (intra prediction) encoding method is known. This encoding scheme utilizes high spatial correlation in video data. That is to say, in this encoding scheme, it is possible to restore an image in a picture by using only information included in that picture without using other pictures. As another highly efficient encoding method, an inter-picture prediction (inter prediction) encoding scheme is known. This encoding scheme utilizes a characteristic in which video data has a high correlation in the time direction. Note that a picture at a certain timing is similar to a picture at an immediately previous timing in video data. An inter-prediction encoding scheme utilizes this characteristic so as to encode pictures.

In the inter-picture prediction encoding scheme, a current picture is divided into a plurality of blocks. An encoder selects, for each block, a region similar to the current picture block from the decoded picture of an encoded frame, and calculates the difference between the selected similar region and the current picture block so as to remove redundancy in the time direction. Then, vector information representing the similar region and the difference information with the redundancy having been removed are encoded so as to achieve a high compression rate.

For example, in a data transmission system employing inter-prediction encoding, a transmitter device generates motion vector data representing a "motion" toward a target picture from the previous picture, and also generates difference data between the predicted image of the target picture and the actual image of the target picture, and transmits to the receiver device the generated motion vector data and difference data. The predicted image is generated using the previous picture and the motion vector data. The receiver device reproduces the target picture from the received motion vector data and difference data. Note that as moving picture encoding schemes, there are ISO/IEC MPEG-2 and MPEG-4 (hereinafter, referred to as MPEG-2 and MPEG-4).

According to MPEG-2, I-picture, P-picture, and B-picture are defined. The I-picture is obtained by encoding information only within the picture. The P-picture is obtained by performing forward-direction inter-picture prediction in accordance with a past picture and encoding the prediction error. The B-picture is obtained by performing bi-directional inter-picture prediction in accordance with a past picture and a future picture, and encoding the prediction error.

Highly efficient methods (i.e., a high compression rate) are desirable in video encoding/decoding. As a method for enhancing encoding/decoding efficiency, a signal encoding method including the first through third steps described below is proposed. The first step obtains as a reference signal a signal in a correlation with an encoding target signal. The second step derives, in accordance with the characteristic of the obtained reference signal, a transform basis serving as fundamentals of the transform rule. The third step transforms the encoding target signal in accordance with the transform rule in accordance with the derived transform basis so as to encode the encoding target signal. (Japanese Laid-open Patent Publication No. 2002-314428 for example).

Also, as a related technique, a predictive decoding device is proposed in Japanese Laid-open Patent Publication No. 2000-59785.

As described above, highly efficient methods are desirable for video encoding and decoding. Further, various methods for enhancing efficiency in encoding/decoding are proposed. However, further improvement is required in encoding and decoding of video data.

When, for example, image information is to be encoded, an orthogonal transform or the like may be performed in order to generate a coefficient sequence representing that image information. The generated coefficient sequence is scanned using a specified pattern, and thereafter entropy encoded. However, according to conventional techniques, the encoding/decoding efficiency becomes lower depending on characteristics of images.

SUMMARY

According to an aspect of the invention, a video encoder includes: a motion compensation picture signal generator to generate a plurality of motion compensation picture signals in accordance with an encoding target signal representing an encoding target picture and a plurality of reference pictures; a prediction signal generator to generate a prediction signal of the encoding target signal by utilizing the plurality of motion compensation picture signals; a prediction error signal generator to generate a prediction error signal representing a difference between the encoding target signal and the prediction signal; a selector to select, from among a plurality of scan patterns prepared for generating encoded information from the prediction error signal, a scan pattern that is expected to minimize an information amount of an encoded state of the prediction error signal, in accordance with the plurality of motion compensation picture signals; and a zigzag scanner to generate encoded information from the prediction error signal by using the scan pattern selected by the selector.

According to another aspect of the invention, a video encoder that encodes an encoding target signal including a luminance signal and a color difference signal, includes: a luminance prediction signal generator to generate a luminance prediction signal representing a predicted value of a luminance signal; a luminance prediction error signal generator to generate a luminance prediction error signal representing a difference between the luminance signal of the encoding target signal and the luminance prediction signal; a color difference prediction signal generator to generate a color difference prediction signal representing a predicted value of a color difference signal; a color difference prediction error signal generator to generate a color difference prediction error signal representing a difference between the color difference signal of the encoding target signal and the color difference prediction signal; a selector to select, from among a plurality of scan patterns prepared for generating luminance encoded information from the luminance prediction error signal, a scan pattern that is expected to minimize an information amount of an encoded state of the luminance prediction error signal, in accordance with the color difference prediction error signal; and a zigzag scanner to generate luminance encoded information from the luminance prediction error signal by using the scan pattern selected by the selector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates a configuration of a video decoder according to an embodiment;

FIG. 5 explains an outline of an encoding method according to an embodiment;

FIG. 6 illustrates scan patterns provided by a zigzag scanner;

FIG. 7 explains relationships between scan patterns and the information amounts of encoded information;

FIG. 10 is a flowchart indicating an encoding method according to the first embodiment;

FIG. 14 is a flowchart indicating an encoding method according to the second embodiment;

FIG. 16 is a flowchart indicating a decoding method according to the second embodiment;

FIG. 17 illustrates a configuration of an encoder according to a third embodiment;

DESCRIPTION OF EMBODIMENTS

Figure 1:
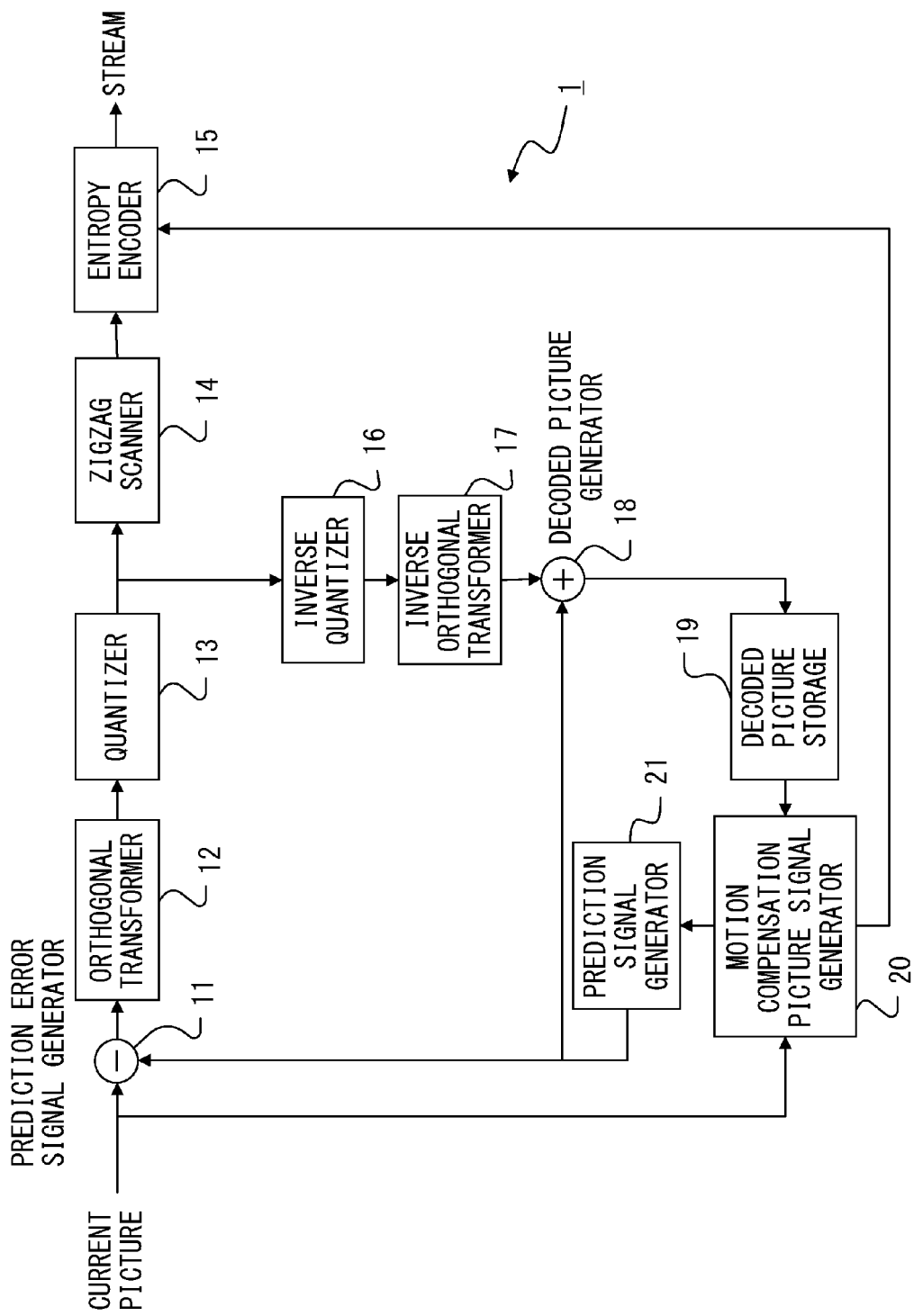
FIG. 1 illustrates a configuration of a video encoder according to an embodiment.

FIG. 1 illustrates a configuration of a video encoder according to an embodiment. A video encoder 1 illustrated in FIG. 1 includes a prediction error signal generator 11, an orthogonal transformer 12, a quantizer 13, a zigzag scanner 14, an entropy encoder 15, an inverse quantizer 16, an inverse orthogonal transformer 17, a decoded picture generator 18, a decoded picture storage 19, a motion compensation picture signal generator 20, and a prediction signal generator 21. The video encoder 1 divides each picture of a video into a plurality of blocks, and performs an encoding process on each of the blocks. The size of the blocks may be fixed or may be variable.

Block data representing the image in each block obtained by dividing a current picture (an encoding target picture) is input to the prediction error signal generator 11. The size of a block is, for example, 16×16 pixels (macro block). The prediction error signal generator 11 calculates the difference between the encoding target block data and a prediction signal (the block data) of a predicted picture provided by the prediction signal generator 21 so as to generate a prediction error signal.

The orthogonal transformer 12 performs an orthogonal transform process on the prediction error signal. This orthogonal transform generates a frequency domain signal having horizontal frequency components and vertical frequency components separated from each other. An orthogonal transform is, for example, a discrete cosine transform (DCT). The quantizer 13 quantizes a signal output from the orthogonal transformer 12. By the quantization, the amount of code of the transformed prediction error signal is reduced. A signal output from the quantizer 13 is provided to the zigzag scanner 14 and the inverse quantizer 16.

The zigzag scanner 14 scans a signal (a plurality of coefficients) output from the quantizer 13 in accordance with a specified or selected scan pattern, and generates run-level information. Run-level information includes information representing a value of a coefficient that is not zero, information representing a length over which zeros continue, and the like. The entropy encoder 15 performs entropy encoding (variable-length encoding) on the run-level information output from the zigzag scanner 14. In entropy encoding, code having a variable length is assigned in accordance with the appearance frequency of symbols.

The inverse quantizer 16 inversely quantizes a signal output from the quantizer 13. The inverse orthogonal transformer 17 performs inverse, orthogonal transform on a signal output from the inverse quantizer 16. Processes performed by the inverse quantizer 16 and the inverse orthogonal transformer 17 correspond to processes performed by the quantizer 13 and the orthogonal transformer 12, respectively. In other words, by performing decoding processes by using the inverse quantizer 16 and the inverse orthogonal transformer 17, a signal similar to the prediction error signal (referred to as reproduced prediction error signal, hereinafter) is obtained.

The decoded picture generator 18 adds, to block data of a predicted image generated by the prediction signal generator 21, a reproduced prediction error signal output from the inverse orthogonal transformer 17. Thereby, a locally decoded picture is generated. The decoded picture storage 19 stores, as data of a reference picture, block data generated by the decoded picture generator 18.

The motion compensation picture signal generator 20 calculates the motion vector of the encoding target block according to block data of an encoding target block of the current picture and block data of a reference picture stored in the decoded picture storage 19. A motion vector is a value representing a spatial shift between the current picture and a reference picture, and is implemented by, for example, a block matching technique, which searches for the position of the block in a reference picture that is the most similar to the encoding target block in the current picture. The motion compensation picture signal generator 20 performs motion compensation in accordance with the motion vector, and generates block data of the reference picture to which motion compensation has been applied.

The prediction signal generator 21 generates a prediction signal of an encoding target signal in accordance with the block data of a reference picture obtained by the motion compensation picture signal generator 20. This prediction signal is provided to the prediction error signal generator 11 as described above.

FIG. 2 illustrates a configuration of a video decoder according to an embodiment. A video decoder 2 illustrated in FIG. 2 includes an entropy decoder 31, an inverse zigzag scanner 32, an inverse quantizer 33, an inverse orthogonal transformer 34, a motion compensation picture signal generator 35, a prediction signal generator 36, a decoded picture generator 37, and a decoded picture storage 38. The video decoder 2 decodes encoded information generated by the video encoder 1 illustrated in FIG. 1, and reproduces the picture.

The entropy decoder 31, the inverse zigzag scanner 32, the inverse quantizer 33, and the inverse orthogonal transformer 34 perform processes corresponding to those performed by the entropy encoder 15, the zigzag scanner 14, the quantizer 13, and the orthogonal transformer 12 illustrated in FIG. 1, respectively. Thus, a prediction error signal is reproduced from a received data stream.

The motion compensation picture signal generator 35 generates a motion-compensation picture signal by using a reference picture stored in the decoded picture storage 38 and a motion vector received from the encoder. The prediction signal generator 36 generates, in accordance with the motion-compensation picture signal, a prediction signal representing the predicted value of a decoded picture. The motion compensation picture signal generator 35 and the prediction signal generator 36 generate a prediction signal using substantially the same method as that used by the motion compensation picture signal generator 20 and the prediction signal generator 21 illustrated in FIG. 1.

The decoded picture generator 37 adds, to a prediction signal generated by the prediction signal generator 36, a signal output from the inverse orthogonal transformer 34 (i.e., a reproduced prediction error signal) so as to generate a decoded picture. The generated decoded picture is stored in the decoded picture storage 38 as a reference picture to be used in subsequent decoding processes.

<Encoding/Decoding of Embodiments>

Figure 3:
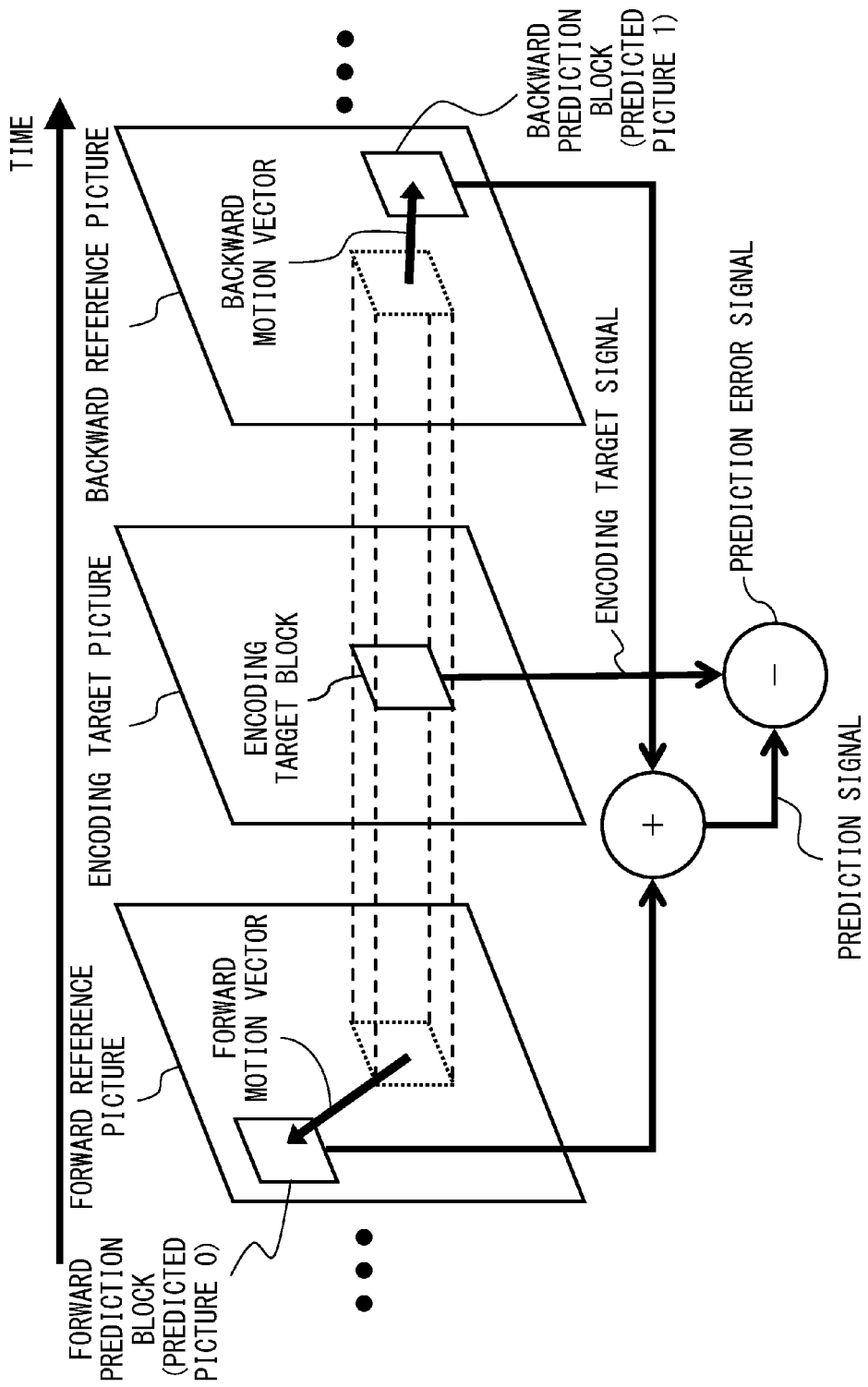
FIG. 3 explains bi-directional prediction.

FIG. 3 explains bi-directional prediction. In bi-directional prediction (or bi-predictive), a forward reference picture and a backward reference picture are used. A forward reference picture (forward motion compensation picture) is selected from among a plurality of reference pictures displayed prior to an encoding target picture. Similarly, a backward reference picture (backward motion compensation picture) is selected from among a plurality of reference pictures displayed posterior to the encoding target picture.

A forward prediction block is the picture block that is the most similar to the encoding target block in the forward reference picture. A forward motion vector represents "motion" between the encoding target block and a forward prediction block. Further, a forward motion compensation picture signal representing the image of a forward prediction block is generated. Similarly, a backward prediction block is the picture block that is the most similar to the encoding target block in the backward reference picture. A backward motion vector represents "motion" between the encoding target block and a backward prediction block. Further, a backward motion compensation picture signal representing the image of a backward prediction block is generated. Note that a picture represented by a forward motion compensation picture signal may be referred to as a "predicted picture 0" and a picture represented by a backward motion compensation picture signal may be referred to as a "predicted picture 1" in the following explanations.

The prediction signal of an encoding target signal is generated by calculating the average between the forward motion compensation picture signal and the backward motion compensation picture signal. In other words, the prediction signal is generated by calculating the average between the pixel values of predicted pictures 0 and 1 for each pixel. Then, a prediction error signal representing the difference between the encoding target signal and the prediction signal, forward motion vector information, and backward motion vector information are encoded. Although FIG. 3 depicts an adder to add predicted pictures 0 and 1 to each other, the resultant value is divided by two in an actual configuration. Also, according to H.264, two motion compensation pictures are generated from a plurality of arbitrary reference pictures, and those two motion compensation pictures are weighted and added to each other so that the resultant value is used as a B-picture-predicted picture.

Figure 4:
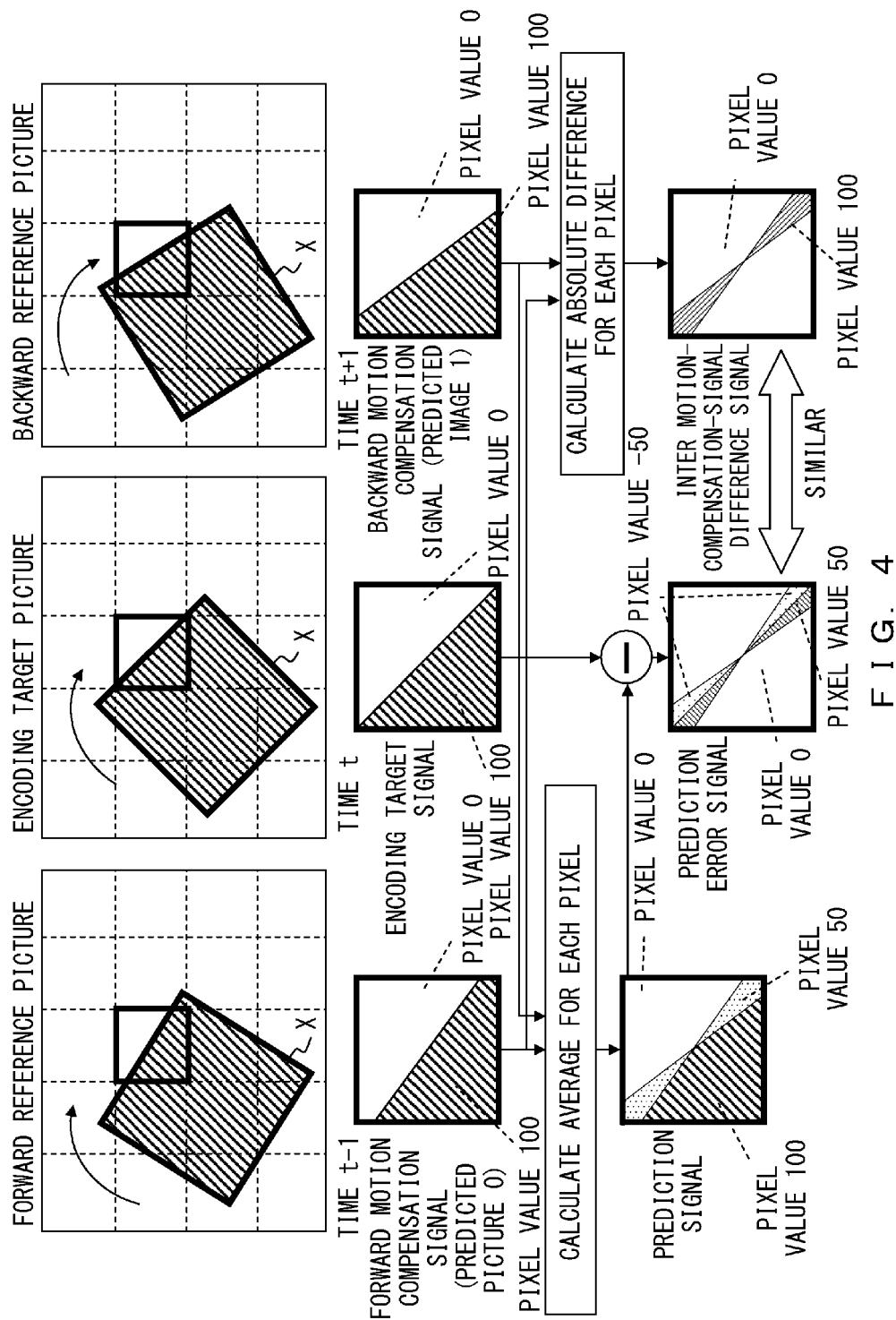
FIG. 4 explains a correlation between a prediction error signal and an inter motion-compensation-signal difference signal.

FIG. 4 explains a correlation between a prediction error signal and an inter motion-compensation-signal difference signal. In the example illustrated in FIG. 4, square object X is rotating in the clockwise direction. In this example, the encoding target picture at time t is encoded by using the forward reference picture at time t−1 and the backward reference picture at time t+1. Additionally, the forward motion vector and the backward motion vector are both zero in this example. Also, pixel values in the region occupied by object X are assumed to be 100, and pixel values in the background regions are assumed to be zero. Pixel values are, for example, luminance levels, although the scope of the present invention is not limited to this example.

As a forward motion compensation block, the region having the smallest difference from the encoding target block is selected. However, because object X is rotating, an image that is completely the same as the image in the encoding target block is not detected in the forward reference picture. In other words, in the forward reference picture, a picture block having a slight difference from the encoding target block is extracted. Similarly, in the backward reference picture, a picture block having a slight difference from the encoding target block is extracted.

As explained in FIG. 3, the prediction signal is generated by averaging the values of predicted pictures 0 and 1 for each pixel. In such a case, the pixel value of each pixel of the prediction signal is "100" in the region where object X exists in both of the predicted pictures 0 and 1, is "50" in the region where object X exists in only one of the predicted pictures 0 and 1, and is "0" in the region where the image is background in both of predicted images 0 and 1.

The prediction signal is subtracted from the encoding target signal for each pixel, thus a prediction error signal is generated. This prediction error signal has, as illustrated in FIG. 4, pixels with a pixel value of "50" and pixels with a pixel value of "−50" along the boundary portion between object X and the background in the encoding target picture.

Here, the difference between predicted pictures 0 and is discussed. The inter motion-compensation-signal difference signal representing the difference between predicted pictures 0 and 1 (or the difference between a forward motion compensation picture signal and a backward motion compensation picture signal) is obtained by calculating the absolute value of difference between predicted pictures 0 and 1 for each pixel. Accordingly, the inter motion-compensation-signal difference signal has pixels with pixel values 100 along the boundary portion between object X and the background in an encoding target picture as illustrated in FIG. 4.

When the prediction error signal and the inter motion-compensation-signal difference signal are compared, they have approximately the same shape as the regions with pixel values other than zero. In other words, a prediction error exists in a region where predicted pictures 0 and 1 have pixel values different from each other. Accordingly, there is a high correlation between the distribution of pixel values of the inter motion-compensation-signal difference signal and the distribution of pixel values of the prediction error signal.

In the encoder illustrated in FIG. 1, a prediction error signal receives an orthogonal transform, and thereafter receives entropy encoding. A plurality of coefficients obtained through the orthogonal transform are transformed into run-level information using, for example, a zigzag scan, and thereafter fed to the entropy encoder 15. When non-zero coefficients obtained through the orthogonal transform are distributed in, for example, a low-frequency component area, the information amount of encoded data obtained by entropy encoding is reduced. However, the distribution of a plurality of coefficients obtained by orthogonally transforming the prediction error signal depends upon the distribution of the pixel values of the prediction error signal. Accordingly, when the distribution of pixel values of the prediction error signal is detected and a scan pattern of a zigzag scan is selected appropriately in accordance with the detected distribution, the information amount of encoded data can be reduced.

In an encoding method according to an embodiment, the above correlation (between the prediction error signal and the inter motion-compensation-signal difference signal) is utilized in order to reduce the information amount of encoded data. In other words, a distribution of pixel values of the inter motion-compensation-signal difference signal is detected instead of a distribution of the prediction error signal. Then a scan pattern of a zigzag scan is appropriately selected in accordance with the distribution of pixel values of the inter motion-compensation-signal difference signal.

FIG. 5 explains an outline of an encoding method according to an embodiment. In this example, it is assumed that the motion compensation picture signal generator 20 has selected predicted pictures 0 and 1 that constitute a pair of motion compensation picture signals by using bi-directional prediction. Predicted pictures 0 and 1 are, for example, a forward reference picture and a backward reference picture, respectively.

The prediction signal generator 21 generates a prediction signal by, for example, calculating the average between predicted pictures 0 and 1, although this example is not limiting the scope of the invention. In such a case, "(predicted picture 0+predicted picture 1)/2" is calculated for the pixel value of each pixel. Also, the prediction error signal generator 11 generates a prediction error signal that represents the difference between an encoding target signal and the prediction signal. In such a case, "encoding target signal−prediction signal" is calculated for each pixel.

An inter motion-compensation-signal difference signal generator 101 generates an inter motion-compensation-signal difference signal that represents the difference between predicted pictures 0 and 1. For this generation, the inter motion-compensation-signal difference signal generator 101 calculates, for example, "predicted picture 0−predicted picture 1" for the pixel value of each pixel in order to generate an inter motion-compensation-signal difference signal.

A selector 102 selects, in accordance with the characteristic amount of the inter motion-compensation-signal difference signal, a scan pattern that is expected to minimize the information amount of the encoded state of the prediction error signal from among a plurality of scan patterns used for generating corresponding run-level information from the prediction error signal. There is a high correlation between the prediction error signal and the inter motion-compensation-signal difference signal, as was explained referring to FIG. 4. This makes it possible for the selector 102 to detect the characteristic of the prediction error signal by referring to the inter motion-compensation-signal difference signal without directly referring to the prediction error signal. Accordingly, the selector 102 can select a scan pattern optimum or favorable for the characteristic of the prediction error signal by referring to the inter motion-compensation-signal difference signal.

A zigzag scanner 103 scans the prediction error signal by using the scan pattern selected by the selector 102, and generates corresponding run-level information. Run-level information is, in this example, encoded information that is obtained by scanning the prediction error signal and thereafter performing run-length encoding. For this process, a scan pattern expected to minimize the information amount of the encoded state of the prediction error signal (i.e., the information amount of run-level information) is selected adaptively. Thus, according to an encoding method according to the embodiment, the information amount of encoded information can be reduced even when the characteristic of the prediction error signal changes.

FIG. 6 illustrates scan patterns provided by the zigzag scanner 103. The zigzag scanner 103 provides, for example, an H.264-frame scan pattern, an H.264-field scan pattern, a vertical-edge-oriented scan pattern, and a horizontal-edge-oriented scan pattern as patterns for scanning a plurality of coefficients (for example, a DCT coefficient) representing a prediction error signal. It is also possible for the zigzag scanner 103 to provide a different scan pattern in addition to the patterns in FIG. 6. For example, an alternate scan pattern of MPEG-2 may be provided.

FIG. 7 explains relationships between scan patterns and the information amounts of encoded information. In this example, coefficients illustrated in FIG. 7A are assumed to have been obtained as a prediction error signal.

When the prediction error signal is scanned using a H.264-frame scan pattern, the coefficient sequence illustrated in FIG. 7B is obtained. When the prediction error signal is scanned using an H.264-field scan pattern, the coefficient sequence illustrated in FIG. 7C is obtained. When a vertical-edge-oriented scan pattern is used, the coefficient sequence illustrated in FIG. 7D is obtained, and when a horizontal-edge-oriented scan pattern is used, the coefficient sequence illustrated in FIG. 7E is obtained.

In the example in FIG. 7, zeros concentrate the most to the tail of the coefficient sequence when the prediction error signal is scanned using a vertical-edge-oriented scan pattern. As a general rule in run-length encoding, the longer that zeros continue consecutively, the smaller the information amount of the encoded information is. Accordingly, in such a case, the information amount of the encoded information of the prediction error signal (run-level information in this example) is minimized when a vertical-edge-oriented scan pattern among the four scan patterns illustrated in FIG. 6 is used. Run-level information includes information representing the value of each non-zero coefficient and information representing the length over which zeros continue consecutively in a coefficient sequence obtained by a zigzag scan. For example, in CAVLC (Context Adaptive Variable Length Coding) the value of a quantized DCT coefficient is represented by "level". Also, the number of consecutive zeros before the non-zero coefficient is represented by "run_before".

In an encoding method according to the embodiment, the selector 102 selects, in accordance with an inter motion-compensation-signal difference signal, a scan pattern that minimizes the information amount of encoded information of a prediction error signal. The zigzag scanner 103 scans coefficients of the prediction error signal by using the scan pattern selected by the selector 102 so as to generate run-level information. Thus, the information amount of encoded information to be generated is reduced. Note that, in an encoding method according to the embodiment, a scan pattern may be selected for each block in accordance with an inter motion-compensation-signal difference signal.

Figure 8:
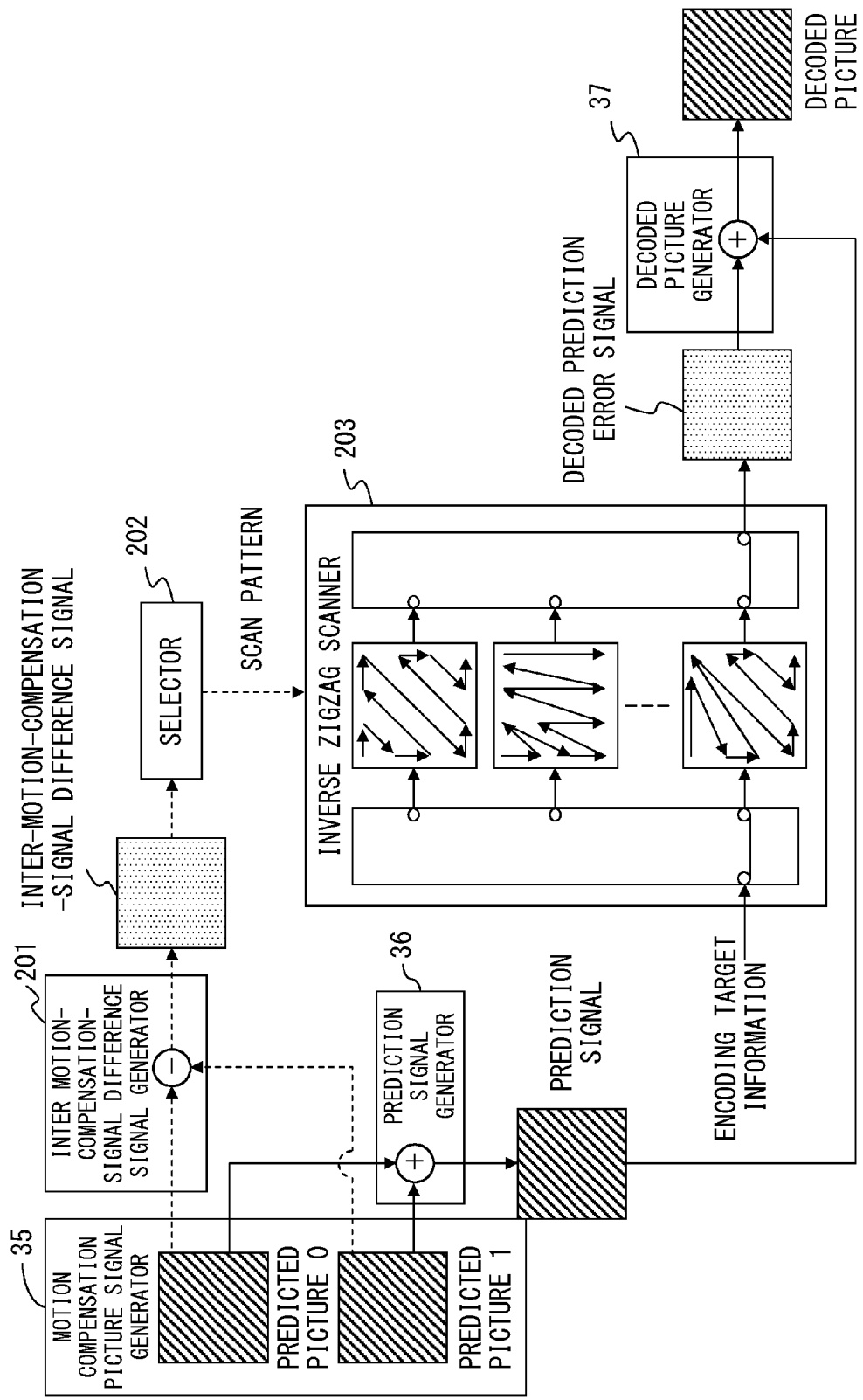
FIG. 8 explains an outline of a decoding method according to an embodiment.

FIG. 8 explains an outline of a decoding method according to an embodiment. In this example, it is assumed that the motion compensation picture signal generator 35 has selected predicted pictures 0 and 1 that constitute a pair of motion compensation picture signals by using bi-directional prediction. Predicted pictures 0 and 1 are generated in accordance with reference pictures that have previously been decoded. This reference pictures are substantially the same as reference pictures used by the encoder illustrated in FIG. 5. Thus, the decoder can generate predicted pictures 0 and 1 that are substantially the same as those generated by the encoder.

Similarly to the prediction signal generator 21 included in the encoder illustrated in FIG. 5, the prediction signal generator 36 calculates the average between predicted pictures 0 and 1 so as to generate a prediction signal. This prediction signal is transmitted to a decoded picture generator 37.

An inter motion-compensation-signal difference signal generator 201 generates an inter motion-compensation-signal difference signal representing the difference between predicted pictures 0 and 1. A selector 202 selects, in accordance with the characteristic amount of the inter motion-compensation-signal difference signal, a scan pattern that is expected to minimize the information amount of the encoded state of the prediction error signal. In this configuration, the inter motion-compensation-signal difference signal generator 201 and the selector 202 perform substantially the same operations as those of the inter motion-compensation-signal difference signal generator 101 and the selector 102 included in the encoder illustrated in FIG. 5, respectively. Accordingly, the selector 202 can select the same scan pattern as that selected by the encoder.

An inverse zigzag scanner 203 inversely scans decoding target information using the scan pattern selected by the selector 202 in order to reproduce a prediction error signal. This decoding target information is output from the entropy decoder 31 illustrated in FIG. 2. The inverse scan is implemented by performing the inverse process of a scanning process performed by the encoder.

The decoded picture generator 37 adds, to the prediction signal generated by the prediction signal generator 36, the prediction error signal output from the inverse zigzag scanner 203. Thereby, a decoded picture is generated.

As has been described above, the decoder selects a scan pattern in accordance with the difference between two predicted pictures, similarly to the encoder. The pictures referred to by the encoder and the decoder for generating predicted pictures are substantially the same to each other. In other words, the encoder and the decoder can generate substantially the same inter motion-compensation-signal difference signals independently from each other. Thus, the encoding/decoding method according to the embodiment makes it possible for the encoder and the decoder to select the same scan patterns without transmitting information to specify that scan pattern from the encoder to the decoder.

It is also possible to employ a configuration in which the encoder transmits information specifying a selected scan pattern to the decoder. In that configuration, the decoder does not have to perform a process of selecting a scan pattern. However, that configuration forces the encoder to transmit a greater amount of data to the decoder, and thus the total efficiency in encoding/decoding does not necessarily increase.

As has been described above, the video encoding/decoding method according to the embodiment utilizes correlations between the distribution of difference values between a plurality of motion-compensation picture signals and the distribution of prediction error signal. In other words, a method of performing run-length encoding on a prediction error signal is selected in accordance with the distribution of difference values between motion-compensation picture signals. This reduces the information amount of encoded information compared with conventional methods (for example, a method that uses a prescribed scan pattern regardless of picture characteristics). Also, since an appropriate scan pattern is selected in accordance with picture characteristics, the information amount of encoded information is reduced even when the block involves a large prediction error (for example, a region involving fine textures or a scene involving sharp movements). Further, since the encoder and the decoder can generate substantially the same motion compensation picture signals, the decoder can perform a corresponding inverse scan without receiving information specifying a scan pattern from the encoder.

<First Embodiment>

Figure 9:
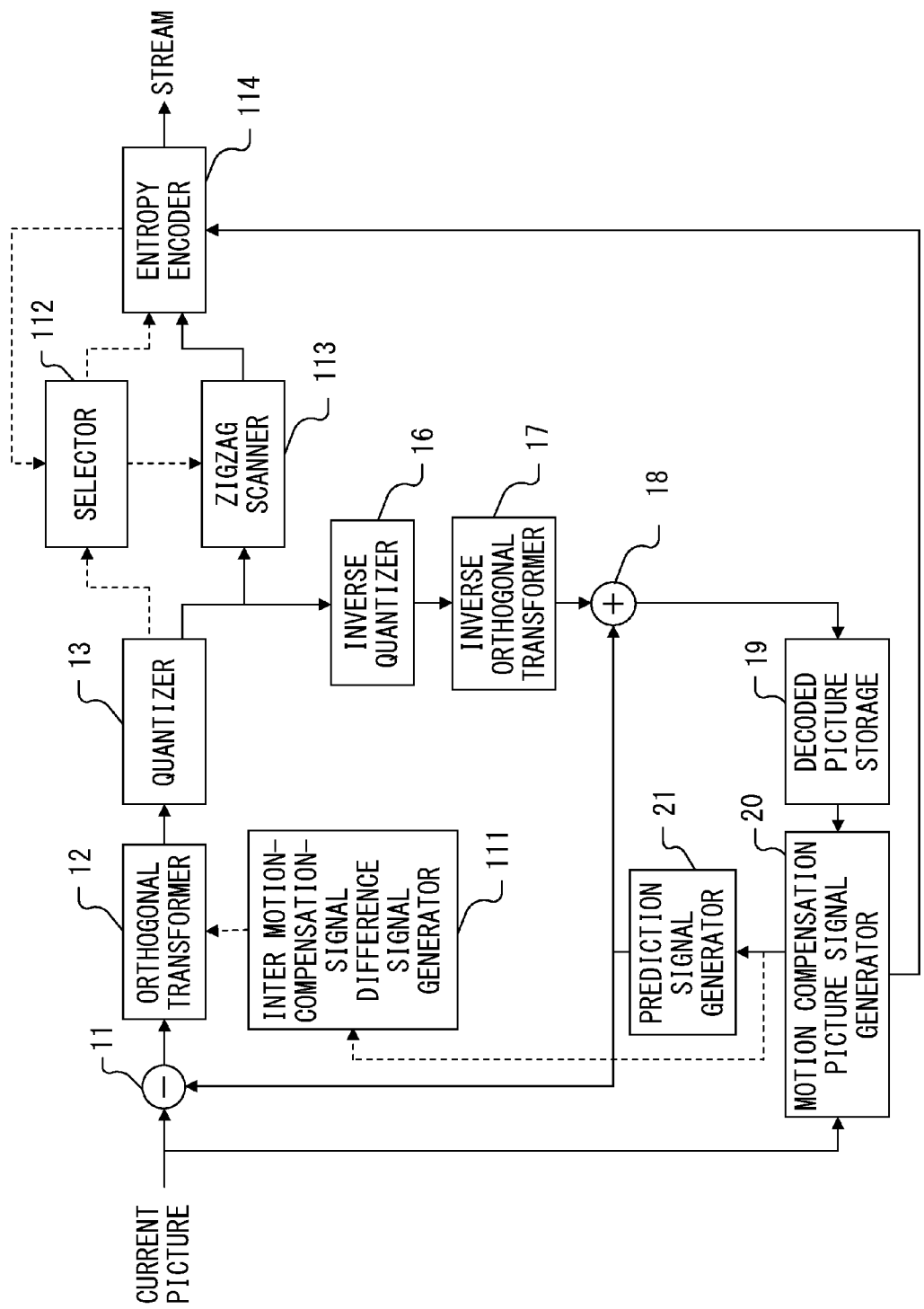
FIG. 9 illustrates a configuration of an encoder according to a first embodiment.

FIG. 9 illustrates a configuration of an encoder according to a first embodiment. The encoder according to the first embodiment includes the prediction error signal generator 11, the orthogonal transformer 12, the quantizer 13, the inverse quantizer 16, the inverse orthogonal transformer 17, the decoded picture generator 18, the decoded picture storage 19, the motion compensation picture signal generator 20, the prediction signal generator 21, an inter motion-compensation-signal difference signal generator 111, a selector 112, a zigzag scanner 113, and an entropy encoder 114. The prediction error signal generator 11, the orthogonal transformer 12, the quantizer 13, the inverse quantizer 16, the inverse orthogonal transformer 17, the decoded picture generator 18, the decoded picture storage 19, the motion compensation picture signal generator 20, and the prediction signal generator 21 are substantially the same as those explained by referring to FIG. 1. Also, the inter motion-compensation-signal difference signal generator 111, the selector 112, and the zigzag scanner 113 correspond to the inter motion-compensation-signal difference signal generator 101, the selector 102, and the zigzag scanner 103 illustrated in FIG. 5, respectively.

First, explanations will be given to a sequence of determining a scan pattern. In the explanations below, it is assumed that the motion compensation picture signal generator calculates two motion vectors and that two motion compensation pictures (predicted pictures 0 and 1 illustrated in FIG. 5) are selected.

The inter motion-compensation-signal difference signal generator 111 generates an inter motion-compensation-signal difference signal that represents the difference between motion compensation picture signals generated by the motion compensation picture signal generator 20. This inter motion-compensation-signal difference signal is fed to the orthogonal transformer 12. The orthogonal transformer 12 performs an orthogonal transform on the inter motion-compensation-signal difference signal. This orthogonal transform generates an inter motion-compensation-signal difference signal represented by frequency components in the horizontal direction and the vertical direction. The quantizer 13 quantizes a signal output from the orthogonal transformer 12.

The selector 112 selects one of a plurality of scan patterns provided by the zigzag scanner 113. The zigzag scanner 113 scans the quantized frequency components with the scan pattern selected by the selector 112, and outputs the corresponding run-level information. Thereafter, the entropy encoder 114 encodes the run-level information, and reports the amount of the encoded information to the selector 112.

The selector 112 sequentially selects respective scan patterns, and the zigzag scanner 113 outputs run-level information corresponding to each of the selected scan patterns. The entropy encoder 114 reports the amount of encoded information corresponding to each scan pattern to the selector 112. Then, the selector 112 sets, in the zigzag scanner 113, the scan pattern that minimizes the amount of encoded information.

Next, explanations will be given for a sequence of encoding an encoding target signal. First, the prediction error signal generator 11 generates a prediction error signal that represents the difference between the encoding target signal and the prediction signal. The encoding target signal represents block data obtained by dividing the current picture of input picture data. A block is, for example, a macro block with a size of 16×16 pixels, although this example is not limiting to the scope of the invention. The prediction signal represents block data of a predicted picture, and is generated from a forward motion compensation block and a backward motion compensation block in bi-directional prediction.

The orthogonal transformer 12 performs an orthogonal transform on the prediction error signal. This orthogonal transform generates a prediction error signal represented by frequency components in the horizontal direction and the vertical direction. The quantizer 13 quantizes a signal output from the orthogonal transformer 12. A signal output from the quantizer 13 is provided to the zigzag scanner 113 and the inverse quantizer 16.

In the zigzag scanner 113, the scan pattern selected by the selector 112 is set. Accordingly, the zigzag scanner 113 scans the quantized frequency components with the scan pattern selected by the selector 112, and outputs the run-level information corresponding to the prediction error signal. The entropy encoder 114 performs entropy encoding (variable-length encoding) on the run-level information output from the zigzag scanner 113, and outputs the resultant information. In the entropy encoding, code having a variable length is assigned in accordance with the appearance frequency of symbols. The entropy encoder 114 may also encode other information (motion vector information and the like, for example).

The inverse quantizer 16 performs inverse quantization on a signal output from the quantizer 13. Also, the inverse orthogonal transformer 17 performs an inverse orthogonal transform on a signal output from the inverse quantizer 16. The inverse quantizer 16 and the inverse orthogonal transformer 17 perform processes corresponding to the quantizer 13 and the orthogonal transformer 12, respectively. Accordingly, a prediction error signal is reproduced by the inverse quantizer 16 and the inverse orthogonal transformer 17. However, the reproduced prediction error signal does not necessarily correspond completely to the prediction error signal output from the prediction error signal generator 11.

The decoded picture generator 18 adds the reproduced prediction error signal to the prediction signal generated by the prediction signal generator 21, and thereby reproduces block data of the current picture. The decoded picture storage 19 stores, as reference picture data, the block data generated by the decoded picture generator 18.

The motion compensation picture signal generator 20 calculates a motion vector by using the block data of the current picture and the block data of a reference picture stored in the decoded picture storage 19. The motion vector is calculated, for example, by using a block matching technique, which searches for the position of the block in the reference picture that is the most similar to the encoding target block in the current picture. The prediction signal generator 21 performs motion compensation using the calculated motion vector so as to generate block data of a motion-compensated reference picture. This block data is provided to the prediction error signal generator 11.

As has been described above, in the encoder according to the first embodiment, the information amount of encoded information of the inter motion-compensation-signal difference signal is calculated for each scan pattern, and the scan pattern that minimizes the information amount is selected. The encoder encodes the prediction error signal by using this scan pattern. There is a high correlation between an inter motion-compensation-signal difference signal and a prediction error signal. In other words, a scan pattern that reduces the information amount of the encoded information of an inter motion-compensation-signal difference signal also reduces the information amount of the encoded information of a prediction error signal. Thus, generating run-level information of a prediction error signal by using the scan pattern selected in the above manner reduces the information amount of the encoded state of the prediction error signal.

FIG. 10 is a flowchart indicating an encoding method according to the first embodiment. The processes of this flowchart are executed for each encoding target block.

In step S1, the motion compensation picture signal generator 20 performs block matching between the encoding target signal and a reference picture stored in the decoded picture storage 19. The block matching selects a motion vector that minimizes the sum of absolute difference "SAD" of the pixel values for coordinates (x, y) in the block between encoding target signal "CurrentPic" and the reference picture "RefPic" as expressed by, for example, expression (1) where "CurrentPic_Pixel" represents a pixel constituting the encoding target signal, and RefPic_Pixel represents a pixel constituting the reference picture. In the encoding method according to the first embodiment, a bi-directional motion vector search has to be conducted. Thus, in step S1, two motion vectors MV0 and MV1 are selected using two reference pictures Ref0 and Ref1.

$$SAD = \sum_{x,y} |CurrentPic\_Pixel(x, y) - RefPic\_Pixel(x, y)| \quad (1)$$

In step S2, the motion compensation picture signal generator 20 obtains predicted pictures (motion compensation pictures) Pred0 and Pred1 specified by motion vectors MV0 and MV1, respectively. The inter motion-compensation-signal difference signal generator 111 calculates a difference "predDiff_Pixel" between the motion compensation signals using expression (2) where Pred0_pixel represents a pixel constituting predicted picture Pred0, and Pred1_Pixel represents a pixel constituting predicted picture Pred1.

$$PredDiff\_Pixel(x,y) = Pred0\_Pixel(x,y) - Pred1\_Pixel(x, y) \quad (2)$$

In step S3, the orthogonal transformer 12 performs an orthogonal transform on inter motion-compensation-signal difference signal PredDiff_Pixel. The orthogonal transform is, for example, a two-dimensional DCT in MPEG-2, and is an integer DCT in H.264. A Hadamard transform may also be used as a simpler transform. A calculation example of DCT is provided as expression (3) where u and v represent the coordinates of the frequency domain.

$$PredDiff(u, v) = \qquad (3)$$
$$\frac{1}{4} C(u) C(v) \sum_{x,y} PredDiff\_Pixel(x, y) \cos\left(\frac{(2x+1)u\pi}{16}\right) \cos\left(\frac{(2y+1)v\pi}{16}\right)$$

$$C(u), C(v) = \begin{cases} 1/\sqrt{2} \ (u=0 \text{ or } v=0) \\ 1(u=0, v=0) \end{cases}$$

In step S4, the quantizer 13 quantizes inter motion-compensation-signal difference signal PredDiff that has already received an orthogonal transform with a specified quantization step size Q. Thereby, "PredDiff/Q" is generated.

In step S5, the selector 112 and the zigzag scanner 113 generate run-level information corresponding to inter motion-compensation-signal difference signals with each scan pattern. The zigzag scanner 113 provides, for example, four scan patterns illustrated in FIG. 6. In such a case, run-level information is generated with each of the H.264-frame scan pattern, the H.264-field scan pattern, the vertical-edge-oriented scan pattern, and the horizontal-edge-oriented scan pattern.

In step S6, entropy encoder 114 calculates the code length of each of the run-level information. In step S7, the selector 112 selects the scan pattern that minimizes the code length. The selected scan pattern is set in the zigzag scanner 113.

In step S8, the prediction signal generator 21 performs bi-directional prediction. Prediction signal BiPredPic of the bi-directional prediction is represented by the average of the pixel values of respective pixels of predicted pictures Pred0 and Pred1. In other words, "(Pred0+Pred1)/2)" is calculated. Further, the prediction error signal generator 11 calculates, as expressed by expression (4), all prediction error signals CurrDiff_Pixel that represent the differences between pixels at coordinates (x, y) between encoding target signal CurrentPic and prediction signal BiPredPic.

CurrDiff_Pixel(x,y)=CurrPic_Pixel(x,y)−BiPred-
Pic_Pixel(x,y)  (4)

In expression (4), CurrPic_pixel represents a pixel constituting an encoding target signal, and BiPredPic_Pixel represents a pixel constituting a bi-directional prediction signal.

In step S9, the orthogonal transformer 12 performs an orthogonal transform on prediction error signal CurrDiff_Pixel in order to obtain orthogonally transformed signal CurrDiff. In step S10, the quantizer 13 quantizes signal CurrDiff with quantization step size Q. Thereby, "CurrDiff/Q" is generated.

In step S11, the zigzag scanner 113 scans transformed prediction error signal CurrDiff/Q with the scan pattern selected by the selector 112, and generates run-level information (including level information L and run length information R). In step S12, the entropy encoder 114 encodes level information L, run length information R, motion vector information MV0 and MV1, and reference picture information Ref0 and Ref1, and outputs the stream.

Note that the order of executing the respective steps illustrated in FIG. 10 is one example, and the scope of the invention is not limited to this execution order. The encoding method according to the first embodiment works as intended as long as a scan pattern is selected in steps S2 through S7 before the execution of step S11. In addition, steps S2 through S7 and steps S8 through S10 may be executed in parallel.

Figure 11:
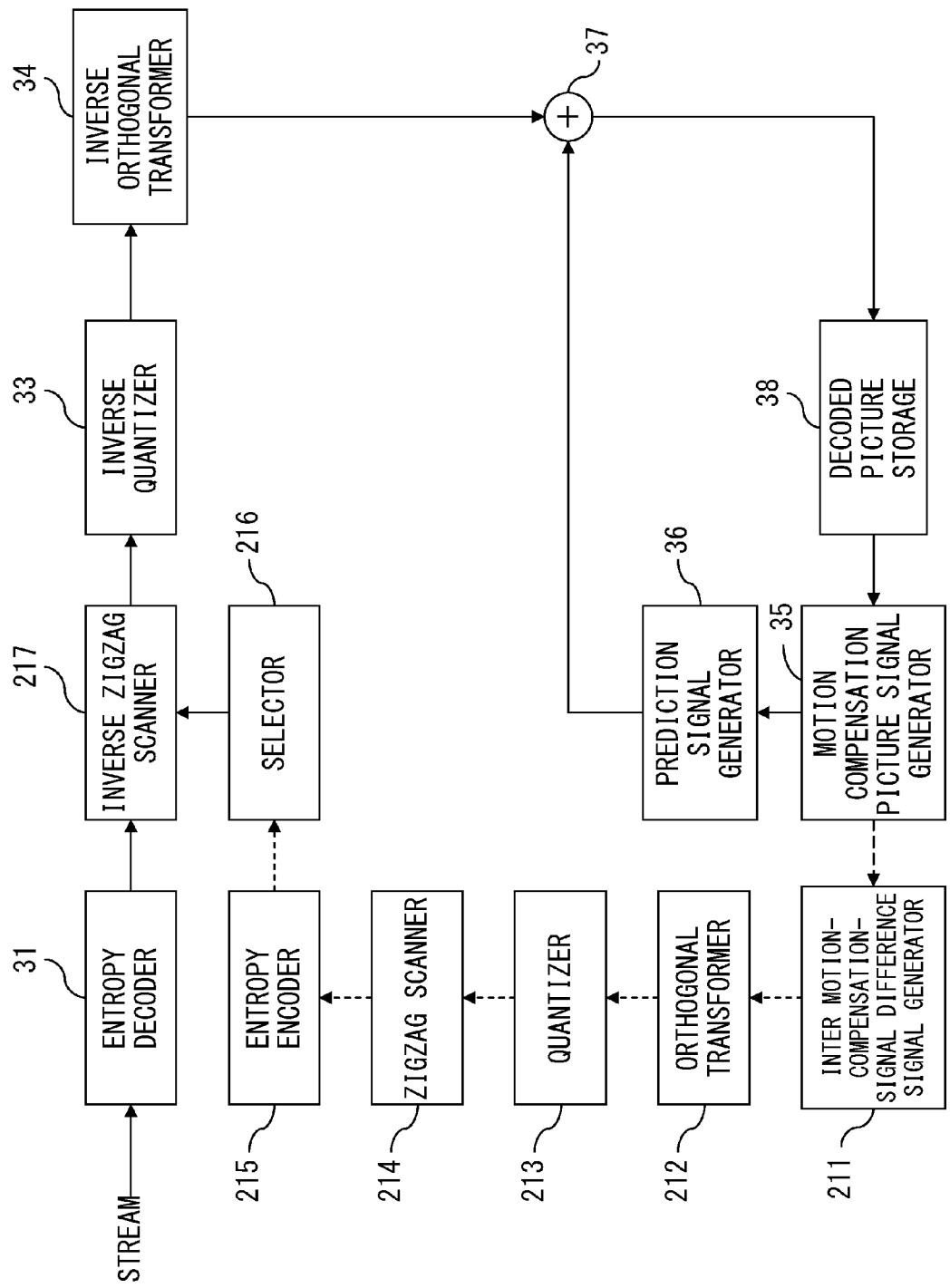
FIG. 11 illustrates a configuration of a decoder according to the first embodiment.

FIG. 11 illustrates a configuration of a decoder according to the first embodiment. The decoder according to the first embodiment includes the entropy decoder 31, the inverse quantizer 33, the inverse orthogonal transformer 34, the motion compensation picture signal generator 35, the prediction signal generator 36, the decoded picture generator 37, the decoded picture storage 38, an inter motion-compensation-signal difference signal generator 211, an orthogonal transformer 212, a quantizer 213, a zigzag scanner 214, an entropy encoder 215, a selector 216, and an inverse zigzag scanner 217. The entropy decoder 31, the inverse quantizer 33, the inverse orthogonal transformer 34, the motion compensation picture signal generator 35, the prediction signal generator 36, the decoded picture generator 37, and the decoded picture storage 38 are substantially the same as those explained by referring to FIG. 2. Also, the inter motion-compensation-signal difference signal generator 211 and the inverse zigzag scanner 217 correspond to the inter motion-compensation-signal difference signal generator 201 and the inverse zigzag scanner 203 illustrated in FIG. 8, respectively. Further, the orthogonal transformer 212, the quantizer 213, the zigzag scanner 214, the entropy encoder 215, and the selector 216 correspond to the selector 202 illustrated in FIG. 8.

The inter motion-compensation-signal difference signal generator 211, the orthogonal transformer 212, the quantizer 213, the zigzag scanner 214, the entropy encoder 215, and the selector 216 perform substantially the same operations as those performed by the inter motion-compensation-signal difference signal generator 111, the orthogonal transformer 12, the quantizer 13, the zigzag scanner 113, the entropy encoder 114, and the selector 112 included in the encoder illustrated in FIG. 9. In other words, also in the decoder, run-level information of an inter motion-compensation-signal difference signal is generated with each of the scan patterns provided by the zigzag scanner 214, and the scan pattern that minimizes the code length is selected. The inverse zigzag scanner 217 decodes a decoding target signal output from the entropy decoder 31 with the selected scan pattern to reproduce a prediction error signal.

Figure 12:
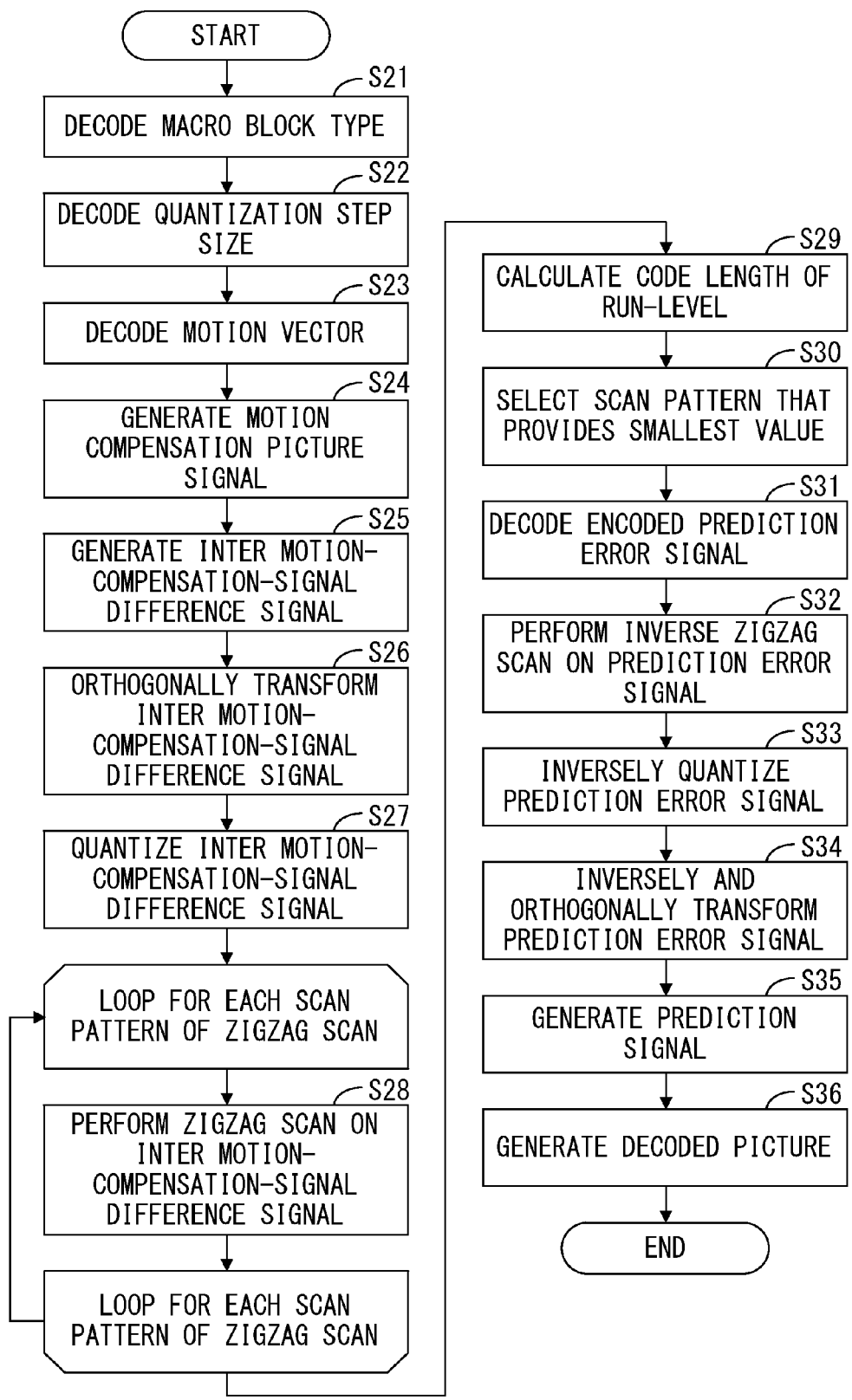
FIG. 12 is a flowchart indicating the decoding method according to the first embodiment.

FIG. 12 is a flowchart indicating an decoding method according to the first embodiment. The processes of this flowchart are executed for each decoding target block.

In steps S21 through S23, macro block type information, quantizing step size information, and motion vector information of a bi-directional prediction are decoded. In step S24, the motion compensation picture signal generator 35 generates a predicted picture (motion compensation picture signal) using the information obtained in steps S21 through S23.

Steps S25 through S30 are substantially the same as steps S2 through S7 executed by the encoding method. Specifically, the scan pattern that minimizes the code length is selected. The selected scan pattern is set in the inverse zigzag scanner 217.

In step S31, the entropy decoder 31 performs entropy decoding on an encoded prediction error signal. In step S32, the inverse zigzag scanner 217 performs, according to the scan pattern selected in step S30, an inverse zigzag scan on a signal output from the entropy decoder 31. In step S33, the inverse quantizer 33 inversely quantizes a signal output from the inverse zigzag scanner 217. In step S34, the inverse orthogonal transformer 34 performs an inverse orthogonal transform on a signal output from the inverse quantizer 33, and thereby reproduces a prediction error signal. In step S35, the prediction signal generator 36 generates a prediction signal by using a predicted picture obtained by the motion compensation picture signal generator 35. In step S36, the decoded picture generator 37 adds the prediction error signal obtained in step S34 to the prediction signal obtained in step S35, and thereby generates a decoded picture.

Note that the order of executing the respective steps illustrated in FIG. 12 is one example, and the scope of the invention is not limited to this execution order. The decoding method according to the first embodiment works as intended as long as a scan pattern is selected before the execution of step S32.

<Second Embodiment>

Figure 13:
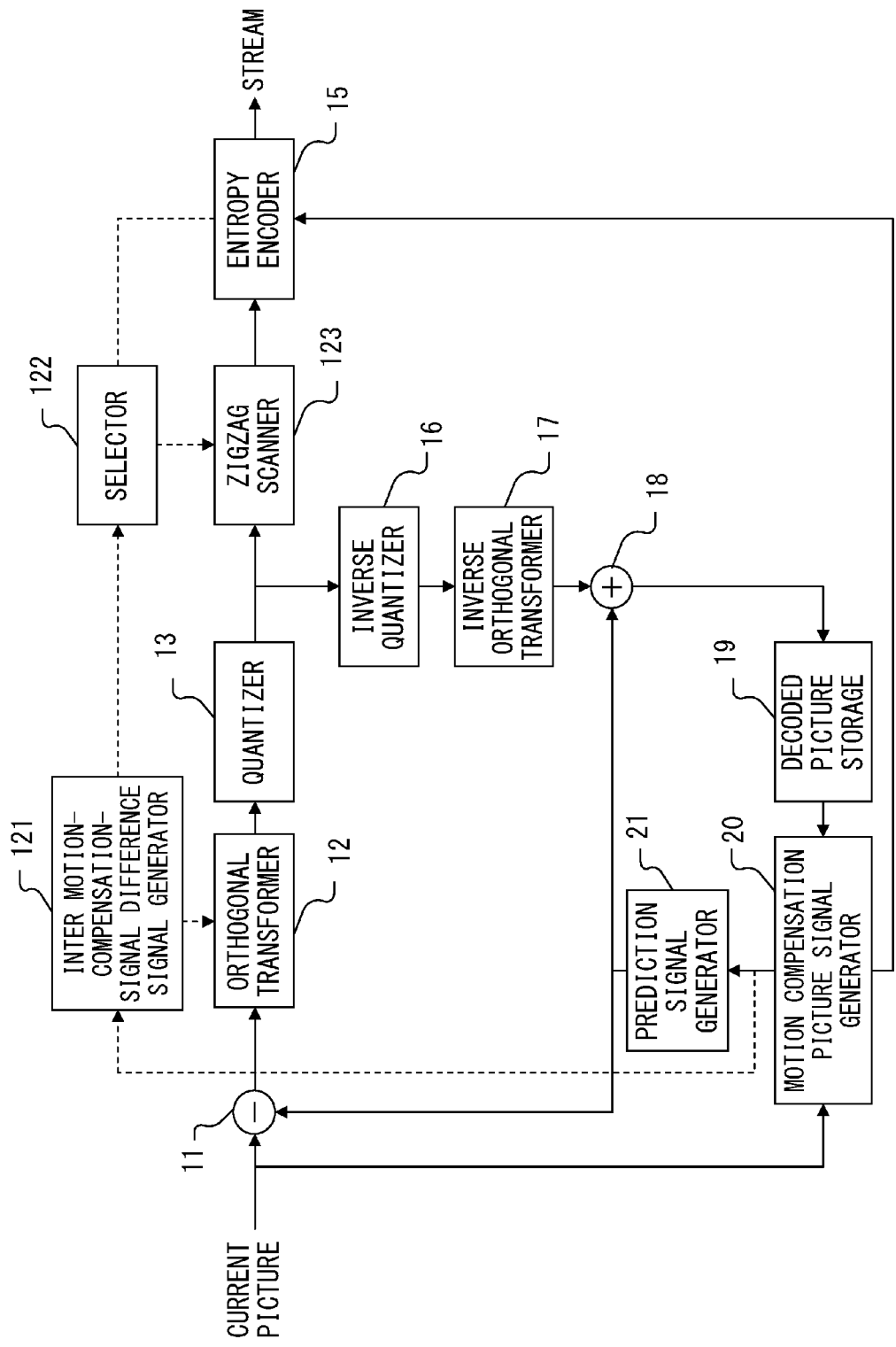
FIG. 13 illustrates a configuration of an encoder according to a second embodiment.

FIG. 13 illustrates a configuration of an encoder according to the second embodiment. The encoder according to the second embodiment includes the prediction error signal generator 11, the orthogonal transformer 12, the quantizer 13, the entropy encoder 15, the inverse quantizer 16, the inverse orthogonal transformer 17, the decoded picture generator 18, the decoded picture storage 19, the motion compensation picture signal generator 20, the prediction signal generator 21, an inter motion-compensation-signal difference signal generator 121, a selector 122, and a zigzag scanner 123. The prediction error signal generator 11, the orthogonal transformer 12, the quantizer 13, the entropy encoder 15, the inverse quantizer 16, the inverse orthogonal transformer 17, the decoded picture generator 18, the decoded picture storage 19, the motion compensation picture signal generator 20, and the prediction signal generator 21 are substantially the same as those explained by referring to FIG. 1. The inter motion-compensation-signal difference signal generator 121, the selector 122, and the zigzag scanner 123 correspond to the inter motion-compensation-signal difference signal generator 101, the selector 102, and the zigzag scanner 103 illustrated in FIG. 5, respectively.

First, explanations will be given for a sequence of determining a scan pattern. In the explanations below, it is assumed, similarly to the first embodiment, that the motion compensation picture signal generator 20 calculates two motion vectors and two motion compensation pictures (predicted pictures 0 and 1 illustrated in FIG. 5) are selected. Also, the inter motion-compensation-signal difference signal generator 121 generates an inter motion-compensation-signal difference signal.

The selector 122 performs a pixel edge detection process on the inter motion-compensation-signal difference signal, and detects the edge direction (for example, a horizontal edge or a vertical edge). The amplitude of the edge may be detected by the selector 122 together with the edge direction. The selector 122 selects a scan pattern in accordance with the detected edge direction, and sets the selected pattern in the zigzag scanner 123.

A configuration and an operation of encoding an encoding target signal in the second embodiment are substantially the same as those in the first embodiment. In other words, the prediction error signal generator 11 generates a prediction error signal. The prediction error signal receives an orthogonal transform and quantization, and is provided to the zigzag scanner 123. The zigzag scanner 123 generates run-level information from the prediction error signal by using the scan pattern selected by the selector 122. The entropy encoder 15 encodes the generated run-level information. Further, the inverse quantizer 16 and the inverse orthogonal transformer 17 reproduce the prediction error signal, and the decoded picture generator 18 generates a decoded picture. The decoded picture is stored in the decoded picture storage 19 as a reference picture to be used in a subsequent encoding process.

As has been described above, in the encoder according to the second embodiment, the edge direction of the block represented by an inter motion-compensation-signal difference signal is detected, and a scan pattern corresponding to that edge direction is selected. As was explained by referring to FIG. 7, appropriate selection of a scan pattern in accordance with the distribution of the prediction error signal (i.e., the distribution of orthogonal transform coefficients) for generating a run-level information by performing a zigzag scan on the prediction error signal results in a shorter code length. In view of this fact, it is thought, for example, that if a vertical direction scan is given priority when a prediction error signal has a vertical edge, then zeros will tend to concentrate at the last part of the coefficient sequence. Similarly, it is thought, for example, that if a horizontal direction scan is given priority when a prediction error signal has a horizontal edge, then zeros will tend to concentrate at the last part of the coefficient sequence. Concentration of zeros at the last part of a coefficient sequence results in a smaller code length of the run-level information.

Thus, a scan pattern is selected in accordance with the edge direction of a prediction error signal in the second embodiment. However, as has already been described above, there is a high correlation between an inter motion-compensation-signal difference signal and a prediction error signal. In other words, it is thought that the edge direction of the prediction error signal and the edge direction of the inter motion-compensation-signal difference signal are almost the same as each other. Accordingly, the selector 122 detects the edge direction of inter motion-compensation-signal difference signal instead of prediction error signal, and selects, in accordance with the detected edge direction, a scan pattern that is expected to minimize the information amount of the run-level information of the prediction error signal. Thus, when the run-level information of the prediction error signal is generated using the scan pattern selected in the above manner, the information amount of the encoded run-level information is reduced.

FIG. 14 is a flowchart indicating an encoding method according to the second embodiment. The processes of this flowchart are executed for each encoding target block.

Steps S41 and S42 are substantially the same as steps S1 and S2 in the first embodiment. Specifically, the motion compensation picture signal generator 20 calculates a motion vector, and the inter motion-compensation-signal difference signal generator 121 generates an inter motion-compensation-signal difference signal.

In step S43, the selector 122 detects the pixel edge of the inter motion-compensation-signal difference signal. A pixel edge is detected by, for example, calculating the absolute value of the pixel value for each pixel of the inter motion-compensation-signal difference signal and performing a filter calculation on the calculation result by using an edge detection filter. As an edge detection filter, a Sobel filter, for example, is used.

A Sobel filter is implemented by, for example, a vertical edge extraction filter Y (a filter process in the horizontal direction) and a horizontal edge extraction filter X (a filter process in the vertical direction) described below. Input pixel P represents absolute values of each of 3×3 pixels extracted from an inter motion-compensation-signal difference signal block.

$$\text{Input Pixel } (P) \begin{bmatrix} a & b & c \\ d & e & f \\ g & h & i \end{bmatrix}$$

$$\text{Vertical edge extration } (Y) \begin{bmatrix} -1 & 0 & 1 \\ -2 & 0 & 2 \\ -1 & 0 & 1 \end{bmatrix}$$

$$\text{Horizontal edge extraction } (X) \begin{bmatrix} -1 & -2 & -1 \\ 0 & 0 & 0 \\ 1 & 2 & 1 \end{bmatrix}$$

Calculation result dy of a horizontal Sobel filter is expressed by expression (5).

$$dy = PY = -a - 2d - g + c + 2f + i \quad (5)$$

Calculation result dx of a vertical Sobel filter is expressed by expression (6).

$$dx = PX = -a - 2b - c + g + 2h + i \quad (6)$$

Amplitude Amp and edge angle Ang of an edge vector are calculated in accordance with the calculation result of the Sobel filter using expressions (7) and (8), respectively.

$$Amp(\vec{D}_{i,j}) = \sqrt{dx_{i,j}^2 + dy_{i,j}^2} \quad (7)$$

$$Ang(\vec{D}_{i,j}) = \frac{180°}{\pi} \times \tan^{-1}\left(\frac{dy_{i,j}}{dx_{i,j}}\right), \quad (8)$$

$$|Ang(\vec{D}_{i,j})| < 90°$$

By the above calculations, the amplitude and edge angle of the edge vector are detected for each pixel position. When, for example, an encoding target block is 8×8 pixels, 64 sets of edge data (edge vector amplitude data and edge vector angle data) are obtained.

Further, whether or not the edge data of each pixel position satisfies the condition of expression (9) or (10) is decided. When dx is a positive value, expression (9) is used for the decision, and when dx is a negative value, expression (10) is used for the decision. $Ang_L$ and $Ang_H$ represent specified, angles.

$$\tan\left(Ang_L \cdot \frac{\pi}{180°}\right) \cdot dx < dy \leq \tan\left(Ang_H \cdot \frac{\pi}{180°}\right) \cdot dx \quad (9)$$

when $dx > 0$ $$\tan\left(Ang_L \cdot \frac{\pi}{180°}\right) \cdot dx > dy \geq \tan\left(Ang_H \cdot \frac{\pi}{180°}\right) \cdot dx \quad (10)$$

when $dx < 0$

When the number of pixel positions at which the edge data satisfies the condition of expression (9) or (10) is greater than a specified threshold, the direction of the edge vector is determined to be within the scope of "($Ang_L$, $Ang_H$)". In this example, it is assumed that +15° and −15° for example are set as $Ang_L$ and $Ang_H$, respectively. In such a case, the direction of the edge vector is determined to be "horizontal". Similarly, by setting $Ang_L$ and $Ang_H$ appropriately, the vertical edge is detected.

In step S44, the selector 122 selects a scan pattern in accordance with the edge direction and edge amplitude obtained by the filter calculation. For example, when the horizontal edge of an inter motion-compensation-signal difference signal is dominant, the characteristic of an orthogonal transform from a spatial domain to a frequency domain is utilized, and a horizontal-edge-oriented scan pattern is selected. Similarly, when the vertical edge of an inter motion-compensation-signal difference signal is dominant, a vertical-edge-oriented scan pattern is selected. Then, the selector 122 sets the selected scan pattern in the zigzag scanner 123.

Steps S45 through S49 are substantially the same as steps S8 through S12 according to the first embodiment. In other words, a prediction error signal generated by the prediction error signal generator 11 is orthogonally transformed and quantized, and is provided to the zigzag scanner 123. The zigzag scanner 123 generates run-level information of the prediction error signal with the scan pattern selected by the selector 122. Then, the entropy encoder 15 performs entropy encoding on the generated run-level information.

Note that the order of executing the respective steps illustrated in FIG. 14 is one example, and the scope of the invention is not limited to this execution order. For example, steps S45 through S47 may be executed prior to step S42. Or, steps S45 through S47 may be executed in parallel with steps S42 through S44.

Figure 15:
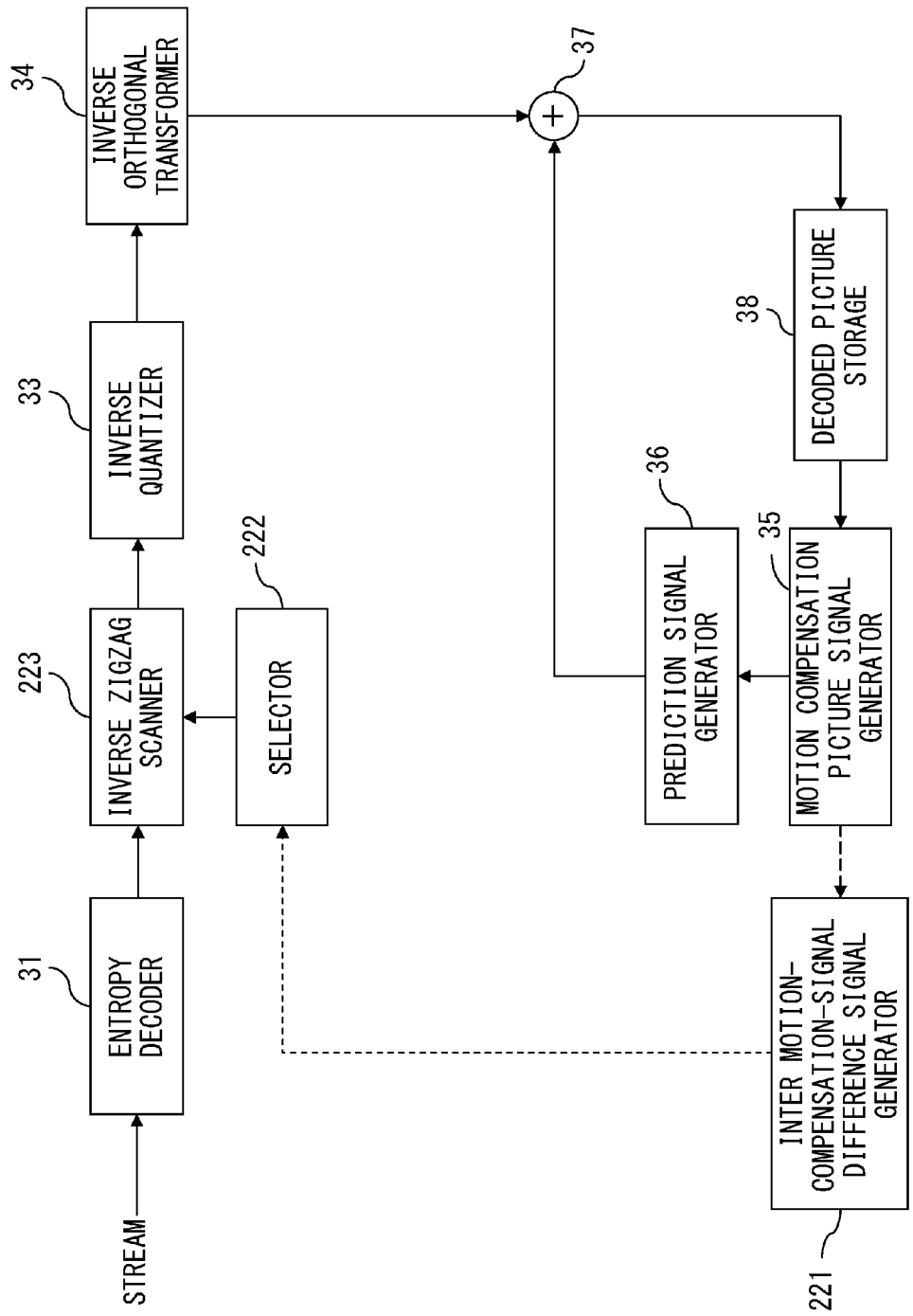
FIG. 15 illustrates a configuration of a decoder according to the second embodiment.

FIG. 15 illustrates a configuration of a decoder according to the second embodiment. The decoder according to the second embodiment includes the entropy decoder 31, the inverse quantizer 33, the inverse orthogonal transformer 34, the motion compensation picture signal generator 35, the prediction signal generator 36, the decoded picture generator 37, the decoded picture storage 38, an inter motion-compensation-signal difference signal generator 221, a selector 222, and an inverse zigzag scanner 223. The entropy decoder 31, the inverse quantizer 33, the inverse orthogonal transformer 34, the motion compensation picture signal generator 35, the prediction signal generator 36, the decoded picture generator 37, and the decoded picture storage 38 are substantially the same as those explained by referring to FIG. 2. The inter motion-compensation-signal difference signal generator 221 and the selector 222 perform substantially the same operations as those performed by the inter motion-compensation-signal difference signal generator 121 and selector 122 illustrated in FIG. 13, respectively. The inverse zigzag scanner 223 performs the inverse process of the process performed by the zigzag scanner 123 illustrated in FIG. 13.

Accordingly, also in the decoder, a scan pattern that minimizes the code length of run-level information of a prediction error signal is selected in accordance with the edge direction (and the edge amplitude) of the inter motion-compensation-signal difference signal. The inverse zigzag scanner 223 decodes a decoding target signal output from the entropy decoder 31 with the selected scan pattern, and thereby reproduces a prediction error signal.

FIG. 16 is a flowchart indicating a decoding method according to the second embodiment. The processes of this flowchart are executed for each decoding target block.

Steps S51 through S55 are substantially the same as steps S21 through S25 according to the first embodiment. Specifically, an inter motion-compensation-signal difference signal is generated. Steps S56 and S57 are substantially the same as steps S43 and S44 executed in the encoding method. Specifically, a scan pattern is selected in accordance with an edge of the inter motion-compensation-signal difference signal. Steps S58 through S63 are substantially the same as steps S31 through S36 according to the first embodiment.

Note that the order of executing the respective steps illustrated in FIG. 16 is one example, and the scope of the invention is not limited to this execution order.

<Third Embodiment>

The applicants of the present patent application have found that if the prediction error of luminance information of a pixel is large, then the prediction error of color difference information of the pixel is also large when the luminance information and the color difference information included in encoding target information are encoded. This means that there are correlations between the position of a pixel with a prediction error of luminance information and the position of a pixel with a prediction error of color difference information. These correlations exist regardless of which prediction signal generation scheme is employed from among inter prediction, bi-directional inter-frame prediction, and intra prediction. Further, these correlations also exist between R components, G components, and B components of an RGB signal.

The utilization of the above correlations makes it possible to estimate the distribution of prediction errors of luminance information from the distribution of prediction errors of color difference information. Accordingly, in the third embodiment, a scan pattern for a zigzag scan used for encoding luminance information is selected in accordance with the distribution of prediction errors of color difference information in order to enhance the efficiency in encoding luminance information. The information amount of luminance information is at least several times that of color difference information. Accordingly, an increase in the efficiency in encoding luminance information contributes greatly to an increase in the efficiency in encoding an entire picture.

In the first and second embodiment, a scan pattern is selected in accordance with the distribution of differences between a plurality of motion compensation picture signals. By contrast, in the third embodiment, a scan pattern for encoding luminance information is selected in accordance with the distribution of prediction errors of color difference information. In other words, although the first through third embodiments select scan patterns using different criteria, these embodiments may employ and perform substantially the same configurations and operations for generating run-level information using the selected scan pattern.

FIG. 17 illustrates a configuration of the encoder according to the third embodiment. Also in the third embodiment, each picture of a video is divided into a plurality of blocks, and the encoder encodes image data for each block. In the configuration illustrated in FIG. 17, luminance components and color difference components of an encoding target picture are input to the encoder.

In this example, a current picture block is represented by Y/Cb/Cr signals. Note that the image format of the Y/Cb/Cr signals is not limited particularly, and may be, for example, in the 4:2:0 format, the 4:2:2 format, or the 4:4:4 format.

A color difference prediction signal generator 301 generates a color difference prediction signal representing a predicted value of color difference information of an encoding target picture. The color difference prediction signal generator 301 is implemented, for example, by inter prediction or bi-directional inter frame prediction employed by MPEG-1, MPEG-2, H.264, and the like or by intra prediction employed by H.264 and the like. Also, a prediction method for each block is determined by a specified prediction-mode decision algorithm.

A color difference prediction error signal generator 302 calculates the difference between the color difference information and the color difference prediction signal of an encoding target picture, and thereby generates a color difference prediction error signal. A color difference encoded information generator 303 reduces redundancies in the spatial direction of a color difference prediction error signal, and generates color difference encoded information. The color difference encoded information generator 303 is implemented by, for example, a combination of an orthogonal transform and quantization employed by MPEG-1, MPEG-2, H.264, and the like.

In such a case, color difference encoded information is a result of quantizing coefficients that have been orthogonally transformed. Also, the color difference encoded information generator 303 may be implemented by Wavelet transform, DPCM, vector quantization, and the like employed by JPEG-2000, and the like.

A reproduced color difference prediction error signal generator 304 generates a reproduced color difference prediction error signal from color difference encoded information. The reproduced color difference prediction error signal generator 304 is implemented by, for example, a combination of an inverse orthogonal transform and inverse quantization employed by MPEG-1, MPEG-2, and H.264. Alternatively, the reproduced color difference prediction error signal generator 304 may be implemented by decoding process of DPCM or vector quantization, or the like.

A decoded color difference picture generator 305 adds the reproduced color difference prediction error signal to the color difference prediction signal, and thereby generates a decoded color difference picture. This decoded picture is stored as a reference picture to be used in a subsequent encoding process.

The configuration for encoding luminance information is similar to the above described configuration for encoding color difference information. Specifically, a luminance prediction signal generator 311 generates a luminance prediction signal. A luminance prediction error signal generator 312 generates a luminance prediction error signal representing a difference between a luminance component of an encoding target signal and the luminance prediction signal. A luminance encoded information generator 313 generates encoded information of a luminance prediction error signal by performing, for example, an orthogonal transform and quantization. A reproduced luminance prediction error signal generator 314 reproduces a luminance prediction error signal by performing, for example, an inverse quantization process and an inverse orthogonal transform. A decoded luminance picture generator 315 generates a decoded picture from the luminance prediction signal and the reproduced luminance prediction error signal. The decoded picture is used as a reference picture in a subsequent encoding process.

A selector 321 selects, in accordance with the distribution of color difference prediction errors, a scan pattern to be used for generating run-level information of a luminance prediction error signal. The selector 321 utilizes a reproduced color difference prediction error signal generated by the reproduced color difference prediction error signal generator 304 in order to detect the distribution of color difference prediction errors. Note that the selector 321 may utilize the color difference prediction error signal generated by the color difference prediction error signal generator 302 in order to detect the distribution of color difference prediction errors.

The selector 321 can select a scan pattern using a method according to the first embodiment. In such a case, the selector 321 uses a zigzag scanner 322 and an entropy encoder 323 in order to generate run-level information of the reproduced color difference prediction error signal for each scan pattern, and selects a scan pattern that minimizes the code length of the run-level information. The selector 321 may also select a scan pattern using a method according to the second embodiment. In such a case, the selector 321 detects the edge direction of pixels of the reproduced color difference prediction error signal, and selects a scan pattern corresponding to the detected edge direction.

The zigzag scanner 322 scans color difference encoded information and luminance encoded information, and generates the run-level information of each of them. For this generation, the zigzag scanner 322 scans the luminance encoded information using the scan pattern selected by the selector 321. Note that color difference encoded information may be scanned using a specified pattern. The entropy encoder 323 performs entropy encoding on the run-level information of the luminance and the color difference.

Figure 18:
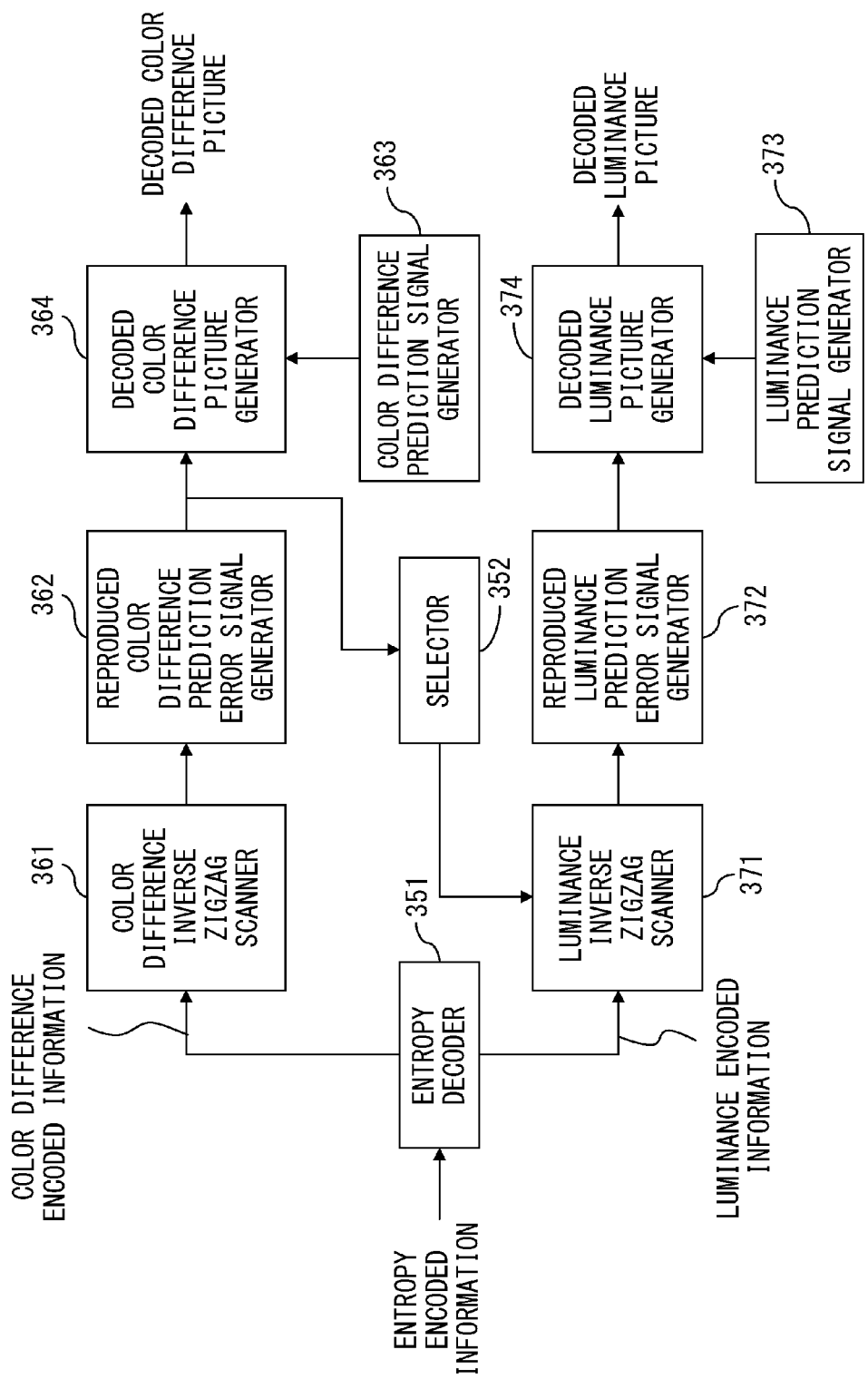
FIG. 18 illustrates a configuration of a decoder according to the third embodiment.

FIG. 18 illustrates a configuration of the decoder according to the third embodiment. The decoder of the third embodiment decodes an encoded data stream (entropy encoded information) that is generated by the encoder illustrated in FIG. 17. The decoder performs the inverse process of the process performed by the encoder. Also, the decoder performs a decoding process for each block.

An entropy decoder 351 decodes entropy decoded information, and reproduces color difference encoded information and luminance encoded information. A color difference inverse zigzag scanner 361 performs an inverse zigzag scanning process on the color difference encoded information. For this process, an inverse scan is performed using a specified pattern. A reproduced color difference prediction error signal generator 362 reproduces a color difference prediction error signal from a signal output from the color difference inverse zigzag scanner 361. A color difference prediction signal generator 363 generates a color difference prediction error signal. A decoded color difference picture generator 364 generates a decoded color difference picture from the color difference prediction signal and the color difference prediction error signal.

A selector 352 selects a scan pattern in accordance with a reproduced color difference prediction error signal generated by the reproduced color difference prediction error signal generator 362. Substantially the same method as used by the selector 321 included in the encoder illustrated in FIG. 17 is used for selecting a scan pattern.

A method of generating a decoded luminance picture from luminance encoded information is substantially the same as a method of generating a decoded color difference picture.

In other words, a luminance inverse zigzag scanner 371 performs an inverse zigzag scanning process on luminance encoded information. A reproduced luminance prediction error signal generator 372 reproduces a luminance prediction error signal from a signal output from the luminance inverse zigzag scanner 371. A luminance prediction signal generator 373 generates a luminance prediction error signal. A decoded luminance picture generator 374 generates a decoded luminance picture from the luminance prediction signal and the luminance prediction error signal. For this generating, the luminance inverse zigzag scanner 371 inversely scans the luminance encoded information using a scan pattern selected by the selector 352.

<Variation>

In the above explanation, a scan pattern that minimizes a code length corresponding to an inter motion-compensation-signal difference signal is selected from among all scan patterns in the first embodiment. However, the first embodiment is not limited to this method. For example, it is also possible in the first embodiment to calculate sequentially code lengths corresponding to inter motion-compensation-signal difference signal for respective scan patterns so as to set, in the zigzag scanner, a pattern that has made a code length shorter than a specified value.

Also, in the above explanations, the second embodiment has adopted a method in which a scan pattern is selected in accordance with the edge direction of the pixel values of inter motion-compensation-signal difference signal. However, the second embodiment is not limited to this method. For example, the second embodiment may employ a configuration in which a scan pattern is selected in accordance with the combination of the edge direction and the edge amplitude of the pixel values of inter motion-compensation-signal difference signal, or in which a scan pattern is selected in accordance with the distribution of the pixel values of inter motion-compensation-signal difference signal.

<Hardware Configuration>

Figure 19:
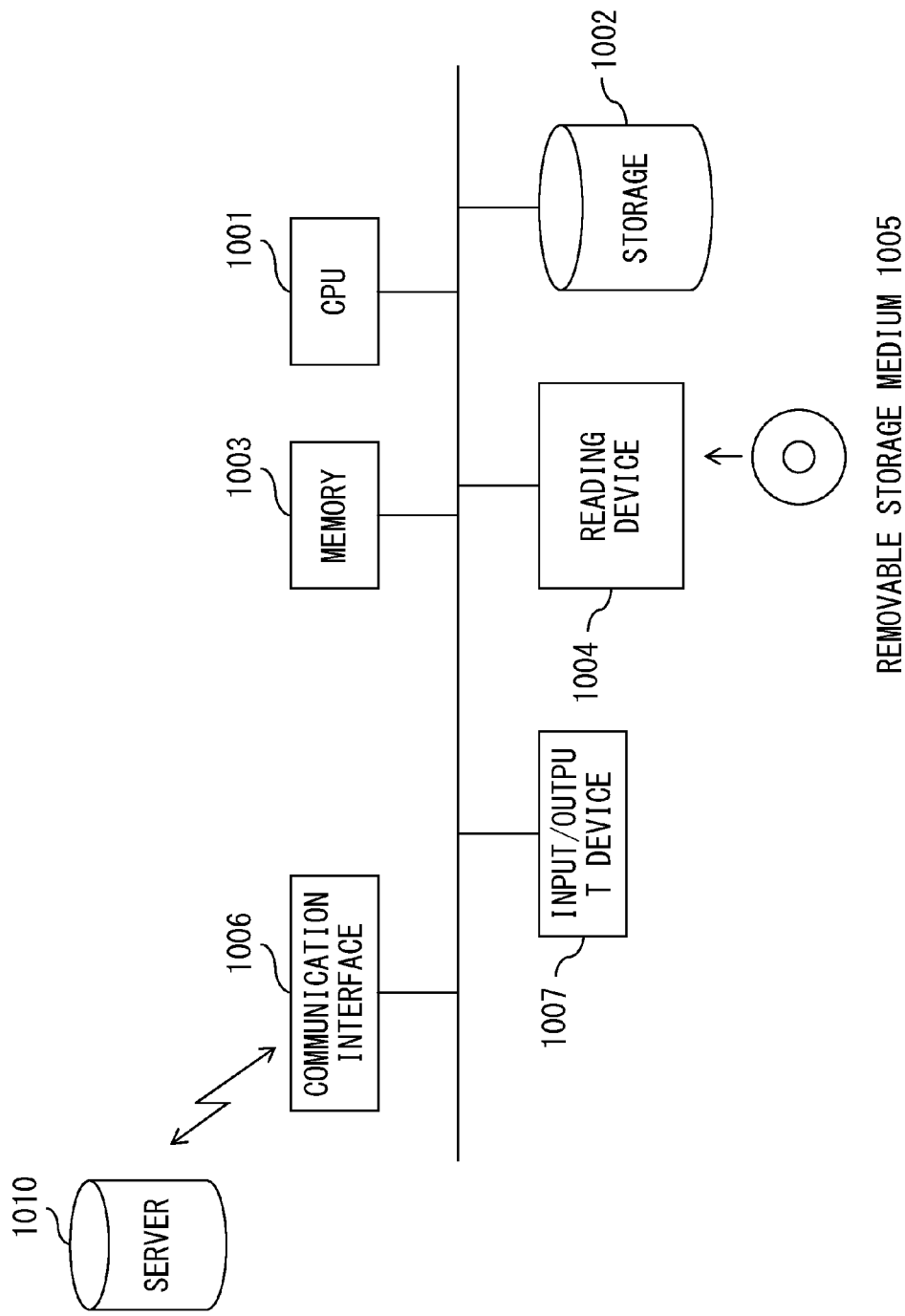
FIG. 19 illustrates a hardware configuration of the encoder and the decoder.

FIG. 19 illustrates a hardware configuration of the encoders or decoders (or a computer or a processor system to implement the encoding/decoding methods) according to the respective embodiments. In FIG. 19, a CPU 1001 uses memory 1003 in order to execute an encoding program or a decoding program. A storage 1002 stores the encoding program or the decoding program. Note that the storage 1002 may be an external storage. The memory 1003 is, for example, semiconductor memory, and is configured to have a RAM area and a ROM area.

A reading device 1004 accesses a removable storage medium 1005 in accordance with instructions from the CPU 1001. The removable storage medium 1005 includes, for example, a semiconductor device, a medium that inputs and outputs information utilizing magnetic effects, and a medium that inputs and outputs information utilizing optical effects. A communication interface 1006 transmits and receives data via a network in accordance with instructions from the CPU 1001. An input/output device 1007 corresponds, in this example, to a display device, a device to receive instructions from a user, or the like.

The encoding program or the decoding program according to the embodiments is provided, for example, in the forms described below.

(1) Provided already installed in the storage 1002
(2) Provided in the removable storage medium 1005
(3) Provided by being downloaded from a program server 1010

The encoders or the decoders according to the embodiments are implemented by executing the encoding program or the decoding program on a computer of the configuration described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. A video encoder, comprising:
   a motion compensation picture signal generator to generate a plurality of motion compensation picture signals in accordance with an encoding target signal representing an encoding target picture and a plurality of reference pictures;
   a prediction signal generator to generate a prediction signal of the encoding target signal by utilizing the plurality of motion compensation picture signals;

a prediction error signal generator to generate a prediction error signal representing a difference between the encoding target signal and the prediction signal;

a selector to select, from among a plurality of scan patterns prepared for generating encoded information from the prediction error signal, a scan pattern that is expected to minimize an information amount of an encoded state of the prediction error signal, in accordance with the plurality of motion compensation picture signals; and a zigzag scanner to generate encoded information from the prediction error signal by using the scan pattern selected by the selector.

2. The video encoder according to claim 1, wherein the motion compensation picture signal generator generates a first motion compensation picture signal from a reference picture for forward motion compensation, and a second motion compensation picture signal from a reference picture for backward motion compensation; and the selector selects a scan pattern used by the zigzag scanner in accordance with an inter motion-compensation-signal difference signal representing a difference between the first and second motion compensation picture signals.

3. The video encoder according to claim 2, further comprising:

a transformer to generate a plurality of coefficients representing the inter motion-compensation-signal difference signals by orthogonally transforming the inter motion-compensation-signal difference signal, wherein the selector selects a scan pattern that minimizes an information amount of encoded information obtained when the zigzag scanner scans the plurality of coefficients using each of the plurality of scan patterns.

4. The video encoder according to claim 2, wherein the selector selects a scan pattern corresponding to a direction of an edge of the inter motion-compensation-signal difference signal.

5. A video decoder that decodes encoded information generated by a video encoder, the video decoder comprising:

a motion compensation picture signal generator to generate a plurality of motion compensation picture signals in accordance with a plurality of reference pictures;

a prediction signal generator to generate a prediction signal of a decoded picture by utilizing the plurality of motion compensation picture signals;

a selector to select, from among a plurality of scan patterns prepared for reproducing a prediction error signal from a decoding target signal, a scan pattern that is determined in accordance with the plurality of motion compensation picture signals;

an inverse zigzag scanner to reproduce a prediction error signal from the decoding target signal by using the scan pattern selected by the scanner; and a decoded picture generator to generate a decoded picture from the prediction error signal and the prediction signal.

6. The video decoder according to claim 5, wherein the motion compensation picture signal generator generates a first motion compensation picture signal from a reference picture for forward motion compensation, and a second motion compensation picture signal from a reference picture for backward motion compensation; and the selector selects a scan pattern used by the inverse zigzag scanner in accordance with an inter motion-compensation-signal difference signal representing a difference between the first and second motion compensation picture signals.

7. The video decoder according to claim 6, further comprising:

a transformer to generate a plurality of coefficients representing the inter motion-compensation-signal difference signals by orthogonally transforming the inter motion-compensation-signal difference signal; and a zigzag scanner to scan the plurality of coefficients using each of the plurality of scan patterns, wherein the selector selects a scan pattern that minimizes an information amount of encoded information obtained when the zigzag scanner scans the plurality of coefficients using each of the plurality of scan patterns.

8. The video decoder according to claim 6, wherein the selector selects a scan pattern corresponding to a direction of an edge of the inter motion-compensation-signal difference signal.

9. A video encoding method, comprising:

generating a plurality of motion compensation picture signals in accordance with an encoding target signal representing an encoding target picture and a plurality of reference pictures;

generating a prediction signal of the encoding target signal by utilizing the plurality of motion compensation picture signals;

generating a prediction error signal representing a difference between the encoding target signal and the prediction signal;

selecting, from among a plurality of scan patterns prepared for generating encoded information from the prediction error signal, a scan pattern that is expected to minimize an information amount of an encoded state of the prediction error signal, in accordance with the plurality of motion compensation picture signals; and generating encoded information from the prediction error signal by using the selected scan pattern.

10. A video decoding method of decoding encoded information generated by a video encoder, the video decoding method comprising:

generating a plurality of motion compensation picture signals in accordance with a plurality of reference pictures;

generating a prediction signal of a decoded picture by utilizing the plurality of motion compensation picture signals;

selecting, from among a plurality of scan patterns prepared for reproducing a prediction error signal from a decoding target signal, a scan pattern that is determined in accordance with the plurality of motion compensation picture signals;

reproducing a prediction error signal from the decoding target signal by using the selected scan pattern; and generating a decoded picture from the prediction error signal and the prediction signal.

11. A non-transitory recording medium that stores a video encoding program to enable a computer perform an encoding method, the video encoding method comprising:

generating a plurality of motion compensation picture signals in accordance with an encoding target signal representing an encoding target picture and a plurality of reference pictures;

generating a prediction signal of the encoding target signal by utilizing the plurality of motion compensation picture signals; generating a prediction error signal representing a difference between the encoding target signal and the prediction signal; selecting, from among a plurality of scan patterns prepared for generating encoded information from the prediction error signal, a scan pattern that is expected to minimize an information amount of an encoded state of the prediction error signal, in accordance with the plurality of motion compensation picture signals;

and generating encoded information from the prediction error signal by using the selected scan pattern.

12. A non-transitory recording medium that stores a video decoding program to enable a computer perform a decoding method to decode encoded information generated by a video encoder, the video decoding method comprising: generating a plurality of motion compensation picture signals in accordance with a plurality of reference pictures; generating a prediction signal of a decoded picture by utilizing the plurality of motion compensation picture signals; selecting, from among a plurality of scan patterns prepared for reproducing a prediction error signal from a decoding target signal, a scan pattern that is determined in accordance with the plurality of motion compensation picture signals; reproducing a prediction error signal from the decoding target signal by using the selected scan pattern; and generating a decoded picture from the prediction error signal and the prediction signal.

13. A video encoder that encodes an encoding target signal including a luminance signal and a color difference signal, the video encoder comprising:
a luminance prediction signal generator to generate a luminance prediction signal representing a predicted value of a luminance signal;
a luminance prediction error signal generator to generate a luminance prediction error signal representing a difference between the luminance signal of the encoding target signal and the luminance prediction signal;
a color difference prediction signal generator to generate a color difference prediction signal representing a predicted value of a color difference signal;
a color difference prediction error signal generator to generate a color difference prediction error signal representing a difference between the color difference signal of the encoding target signal and the color difference prediction signal;
a selector to select, from among a plurality of scan patterns prepared for generating luminance encoded information from the luminance prediction error signal, a scan pattern that is expected to minimize an information amount of an encoded state of the luminance prediction error signal, in accordance with the color difference prediction error signal; and
a zigzag scanner to generate luminance encoded information from the luminance prediction error signal by using the scan pattern selected by the selector.

14. The video encoder according to claim 13, further comprising:
a color difference encoded information generator to generate color difference encoded information from the color difference prediction error signal; and
a reproduced color difference prediction error signal generator to generate a reproduced color difference prediction error signal representing a reproduced value of a prediction error of a color difference from the color difference encoded information, wherein:
the selector selects a scan pattern used by the zigzag scanner in accordance with the reproduced color difference prediction error signal.

15. A video decoder that decodes encoded information including a luminance signal and a color difference signal generated by a video encoder, the video decoder comprising:
a luminance prediction signal generator to generate a luminance prediction signal representing a predicted value of a luminance signal;
a reproduced color difference prediction error signal generator to generate a reproduced color difference prediction error signal from color difference encoded information included in the encoded information;
a selector to select, from among a plurality of scan patterns prepared for reproducing a luminance prediction error signal from luminance encoded information included in the encoded information, a scan pattern that is determined in accordance with the reproduced color difference prediction error signal; and
an inverse zigzag scanner to reproduce a luminance prediction error signal from the luminance encoded information using the scan pattern selected by the selector; and
a decoded luminance picture generator to generate a decoded luminance picture from the reproduced luminance prediction error signal and the luminance prediction signal.

16. A video encoding method of encoding an encoding target signal including a luminance signal and a color difference signal, the video encoding method comprising:
generating a luminance prediction signal representing a predicted value of a luminance signal;
generating a luminance prediction error signal representing a difference between the luminance signal of the encoding target signal and the luminance prediction signal;
generating a color difference prediction signal representing a predicted value of a color difference signal;
generating a color difference prediction error signal representing a difference between the color difference signal of the encoding target signal and the color difference prediction signal;
selecting, from among a plurality of scan patterns for generating luminance encoded information from the luminance prediction error signal, a scan pattern that is expected to minimize an information amount of an encoded state of the luminance prediction error signal, in accordance with the color difference prediction error signal; and
generating luminance encoded information from the luminance prediction error signal by using the selected scan pattern.

17. A video decoding method of decoding encoded information including a luminance signal and a color difference signal generated by a video encoder, the video decoding method comprising:
generating a luminance prediction signal representing a predicted value of a luminance signal;
generating a reproduced color difference prediction error signal from color difference encoded information included in the encoded information;
selecting, from among a plurality of scan patterns prepared for reproducing a luminance prediction error signal from luminance encoded information included in the encoded information, a scan pattern that is determined in accordance with the reproduced color difference prediction error signal;
reproducing a luminance prediction error signal from the luminance encoded information using the selected scan pattern; and
generating a decoded luminance picture from the reproduced luminance prediction error signal and the luminance prediction signal.

18. A non-transitory recording medium that stores a video encoding program to enable a computer perform an encoding method to encode an encoding target signal including a luminance signal and a color difference signal, the video encoding method comprising:

generating a luminance prediction signal representing a predicted value of a luminance signal;

generating a luminance prediction error signal representing a difference between the luminance signal of the encoding target signal and the luminance prediction signal; generating a color difference prediction signal representing a predicted value of a color difference signal;

generating a color difference prediction error signal representing a difference between the color difference signal of the encoding target signal and the color difference prediction signal;

selecting, from among a plurality of scan patterns for generating luminance encoded information from the luminance prediction error signal, a scan pattern that is expected to minimize an information amount of an encoded state of the luminance prediction error signal, in accordance with the color difference prediction error signal; and generating luminance encoded information from the luminance prediction error signal by using the selected scan pattern.

19. A non-transitory recording medium that stores a video decoding program to enable a computer perform a decoding method to decode encoded information including a luminance signal and a color difference signal generated by a video encoder, the video decoding method comprising: generating a luminance prediction signal representing a predicted value of a luminance signal; generating a reproduced color difference prediction error signal from color difference encoded information included in the encoded information; selecting, from among a plurality of scan patterns prepared for reproducing a luminance prediction error signal from luminance encoded information included in the encoded information, a scan pattern that is determined in accordance with the reproduced color difference prediction error signal;

reproducing a luminance prediction error signal from the luminance encoded information using the selected scan pattern; and generating a decoded luminance picture from the reproduced luminance prediction error signal and the luminance prediction signal.

\* \* \* \* \*